United States Patent
Fan et al.

(10) Patent No.: US 12,041,650 B2
(45) Date of Patent: Jul. 16, 2024

(54) COMMUNICATION METHOD AND APPARATUS

(71) Applicant: HUAWEI TECHNOLOGIES CO., LTD., Guangdong (CN)

(72) Inventors: Qiang Fan, Shanghai (CN); Chong Lou, Shanghai (CN); Qufang Huang, Shanghai (CN); Xiaoying Xu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 461 days.

(21) Appl. No.: 17/489,611

(22) Filed: Sep. 29, 2021

(65) Prior Publication Data

US 2022/0022211 A1    Jan. 20, 2022

Related U.S. Application Data

(63) Continuation of application No. PCT/CN2020/079357, filed on Mar. 13, 2020.

(30) Foreign Application Priority Data

Mar. 29, 2019 (CN) .......................... 201910251765.5

(51) Int. Cl.
*H04W 72/566* (2023.01)
*H04L 1/08* (2006.01)
(Continued)

(52) U.S. Cl.
CPC ............. *H04W 72/569* (2023.01); *H04L 1/08* (2013.01); *H04L 1/1812* (2013.01); *H04W 72/1268* (2013.01); *H04W 72/23* (2023.01)

(58) Field of Classification Search
CPC ........... H04W 72/569; H04W 72/1268; H04W 72/23; H04W 72/563; H04W 72/02;
(Continued)

(56) References Cited

U.S. PATENT DOCUMENTS

2019/0261361 A1* 8/2019 Xiong .................... H04W 72/02
2020/0146045 A1* 5/2020 Loehr ................... H04L 1/1812
(Continued)

FOREIGN PATENT DOCUMENTS

CN        108347779 A      7/2018
CN        108738135 A     11/2018
(Continued)

OTHER PUBLICATIONS

Ericsson, On other impacts due to resource conflicts involving configured grants. 3GPP TSG-RAN WG2 #105bis, Xi'an, China, Apr. 8-12, 2019, R2-1904057, 3 pages.
(Continued)

*Primary Examiner* — Will W Lin
(74) *Attorney, Agent, or Firm* — HUAWEI TECHNOLOGIES CO., LTD.

(57) ABSTRACT

A communication method and apparatus is provided, to properly schedule retransmission of an uplink resource in a scenario in which uplink resources overlap in time domain. The method includes: determining, by a terminal, that a priority of a first uplink resource is higher than a priority of a second uplink resource in the first uplink resource and the second uplink resource that have an overlapping part in time domain; and when determining to send a signal by using the first uplink resource on the overlapping part, indicating, by the terminal to a network device, whether a MAC PDU is formed for the second uplink resource or whether data is stored in a corresponding buffer for the second uplink resource.

20 Claims, 14 Drawing Sheets

(51) Int. Cl.
*H04L 1/1812* (2023.01)
*H04W 72/1268* (2023.01)
*H04W 72/23* (2023.01)

(58) Field of Classification Search
CPC .... H04W 72/1263; H04W 72/20; H04L 1/08; H04L 1/1812; H04L 1/1893; H04L 1/1822
See application file for complete search history.

(56) References Cited

U.S. PATENT DOCUMENTS

| | | | |
|---|---|---|---|
| 2021/0227565 A1* | 7/2021 | Li | H04W 72/21 |
| 2021/0266953 A1* | 8/2021 | Pelletier | H04W 72/1268 |
| 2021/0314955 A1* | 10/2021 | Zhang | H04L 5/0053 |
| 2021/0360648 A1* | 11/2021 | Zhang | H04W 72/23 |
| 2021/0385826 A1* | 12/2021 | Moon | H04L 1/00 |
| 2022/0061071 A1* | 2/2022 | Zhou | H04W 72/21 |
| 2022/0078768 A1* | 3/2022 | El Hamss | H04L 5/0055 |
| 2022/0095337 A1* | 3/2022 | Wang | H04L 5/0053 |
| 2022/0132532 A1* | 4/2022 | Wang | H04W 72/1268 |
| 2022/0132556 A1* | 4/2022 | Alabbasi | H04W 72/569 |
| 2022/0150950 A1* | 5/2022 | Islam | H04L 1/1896 |
| 2022/0158769 A1* | 5/2022 | Gou | H04W 72/23 |
| 2022/0248410 A1* | 8/2022 | Lee | H04W 52/32 |

FOREIGN PATENT DOCUMENTS

| | | |
|---|---|---|
| EP | 2728928 A1 | 5/2014 |
| WO | 2018126477 A1 | 7/2018 |
| WO | 2020170043 A2 | 8/2020 |
| WO | 2020194258 A1 | 10/2020 |

OTHER PUBLICATIONS

3GPP TR 38.825 V0.1.1:"3rd Generation Partnership Project; Technical Specification Group Radio Access Network; Study on NR Industrial Internet of Things (IoT); Release 16",Mar. 2019,total 32 pages.

3GPP TS 38.321 V15.4.0:"3rd Generation Partnership Project; Technical Specification Group Radio Access Network; NR; Medium Access Control (MAC) protocol specification (Release 15)",Dec. 2018,total 77 pages.

Ericsson, On grant prioritization involving configured grants, 3GPP TSG RAN WG2 #105b R2-1904055, Mar. 28, 2019, total 4 pages.

* cited by examiner

Uplink resource 2

Set an R bit in any MAC subheader included in a MAC
PDU generated for the uplink resource 2 to 1 or 0

Uplink resource 1

A MAC PDU is generated
for the uplink resource 1

⎯⎯⎯⎯⎯⎯⎯⎯⎯⎯⎯⎯ Time domain ⎯⎯⎯⎯⎯⎯⎯⎯⎯⎯⎯⎯→

FIG. 10a

Uplink resource 2

Set an R bit in any MAC subheader included in a MAC
PDU generated for the uplink resource 2 to 0 or 1

Uplink resource 1

No MAC PDU is generated
for the uplink resource 1

⎯⎯⎯⎯⎯⎯⎯⎯⎯⎯⎯⎯ Time domain ⎯⎯⎯⎯⎯⎯⎯⎯⎯⎯⎯⎯→

FIG. 10b

COMMUNICATION METHOD AND APPARATUS

This application is a continuation of International Application No. PCT/CN2020/079357, filed on Mar. 13, 2020, which claims priority to Chinese Patent Application No. 201910251765.5, filed with the China Patent Office on Mar. 29, 2019 and entitled "COMMUNICATION METHOD AND APPARATUS", which is incorporated herein by reference in its entirety.

TECHNICAL FIELD

This application relates to the field of mobile communications technologies, and in particular, to a communication method and apparatus.

BACKGROUND

In a 5th generation (5G) new radio (NR), there are two uplink resource scheduling mechanisms. One is a dynamic grant (DG) mechanism. Each time a network device schedules an uplink DG, the network device indicates, to a terminal by using downlink control information (DCI), information such as a time-frequency location of a scheduled uplink transmission resource. The other is a configured grant (CG) mechanism. When a network device uses the CG mechanism to configure a CG resource for a terminal, some parameters, such as a period of the CG resource and a quantity of hybrid automatic repeat request (HARQ) processes that use the CG resource, are provided by the network device for the terminal by using radio resource control (RRC) signaling. A time-frequency location, a modulation and coding scheme (MCS), and the like of the CG resource may be provided by the network device for the terminal by using the RRC signaling, or may be provided by the network device for the terminal by using DCI.

In the NR, a plurality of uplink resources may be configured for the terminal by using the CG mechanism and/or the DG mechanism. The plurality of uplink resources may overlap or may not overlap in time domain. When the plurality of uplink resources configured for the terminal overlap in time domain, the terminal needs to select, based on a specific criterion, an uplink resource on which a signal is to be transmitted. For example, two uplink resources that overlap in time domain are configured for the terminal. In a criterion, the terminal may select to transmit a signal on an uplink resource with a higher priority in the two uplink resources. Based on the criterion, the network device cannot receive the signal on an uplink resource with a lower priority. In this process, the terminal may form a media access control (MAC) layer protocol data unit (PDU) or may not form a MAC PDU for the uplink resource with the lower priority. Alternatively, the terminal may store data in a corresponding cache or store no data in a corresponding cache for the uplink resource with the lower priority. Currently, for this scenario, in a processing manner, the network device considers by default that the terminal enables a skip mechanism, regardless of whether the terminal stores data for an uplink resource packet with a lower priority or for the uplink resource with the lower priority, the network device does not schedule retransmission of the uplink resource with the lower priority. In this case, the MAC PDU formed for the uplink resource with the lower priority may be lost. In another processing manner, to reduce a data packet loss, regardless of whether the terminal stores data for an uplink resource packet with a lower priority or for the uplink resource with the lower priority, the network device schedules a retransmission resource for the uplink resource with the lower priority. In this case, scheduling resources may be wasted. Obviously, neither of the two processing manners is applicable to this scenario.

SUMMARY

Embodiments of this application provide a communication method and apparatus, to properly schedule retransmission of an uplink resource in a scenario in which uplink resources overlap in time domain.

According to a first aspect, an embodiment of this application provides a communication method. The method may be applied to a terminal, or may be applied to a chip inside a terminal. The method includes: The terminal determines that a priority of a first uplink resource is higher than a priority of a second uplink resource, and the first uplink resource and the second uplink resource have an overlapping part in time domain. When determining to send a signal by using the first uplink resource on the overlapping part, the terminal indicates, to a network device, whether a MAC PDU is formed for the second uplink resource or whether data is stored in a corresponding buffer for the second uplink resource.

According to a second aspect, an embodiment of this application provides a communication method. The method may be applied to a network device, or may be applied to a chip inside a network device. In the method, the network device determines, according to an indication of a terminal, whether a media access control protocol data unit MAC PDU is formed for an uplink resource or whether data is stored in a corresponding buffer for an uplink resource. When the network device determines that the MAC PDU is formed for the uplink resource or the data is stored in the corresponding buffer for the uplink resource, the network device schedules retransmission of the uplink resource. Alternatively, when the network device determines that no MAC PDU is formed for the uplink resource or that no data is stored in the corresponding buffer for the uplink resource, the network device does not schedule retransmission of the uplink resource.

According to a third aspect, this application provides a communications apparatus, including units or means configured to perform the steps in the first aspect or the second aspect.

According to a fourth aspect, this application provides a communications apparatus, including at least one processor and a memory, where the at least one processor is configured to perform the method provided in the first aspect or the second aspect.

According to a fifth aspect, this application provides a communications apparatus, including at least one processor and an interface circuit, where the at least one processor is configured to perform the method provided in the first aspect or the second aspect.

According to a sixth aspect, this application provides a communications program. When executed by a processor, the program is used to perform the method provided in the first aspect or the second aspect.

According to a seventh aspect, a program product, for example, a computer-readable storage medium, is provided, where the program product includes the program in the sixth aspect.

It can be learned that, in the foregoing aspects, when determining to send the signal on the overlapping part by using an uplink resource with a higher priority, the terminal may indicate, to the network device, whether a MAC PDU is formed for an uplink resource with a lower priority or whether data is stored in a corresponding buffer for an uplink resource with a lower priority. In this way, the network device may determine, according to the indication of the terminal, whether the terminal forms the MAC PDU for the uplink resource with the lower priority or whether the terminal stores the data in the corresponding buffer for the uplink resource with the lower priority, to properly schedule retransmission of the uplink resource with the lower priority.

In the foregoing aspects, the signal may include data and/or control signaling.

In a possible design, a HARQ process associated with the first uplink resource is different from a HARQ process associated with the second uplink resource.

In a possible design, the terminal forms a first MAC PDU for the first uplink resource, and the terminal determines to send the first MAC PDU on the overlapping part by using the first uplink resource.

In a possible design, that the terminal indicates, to a network device, whether a MAC PDU is formed for the second uplink resource or whether data is stored in a corresponding buffer for the second uplink resource includes: The terminal sends indication information to the network device, and the network device receives the indication information from the terminal.

In the embodiments of this application, the indication information is used to indicate whether the MAC PDU is formed for the second uplink resource or whether the data is stored in the corresponding buffer for the second uplink resource.

In a possible design, the indication information is carried in a MAC CE, and the MAC CE is carried in the first MAC PDU.

In a possible design, the indication information is located in a MAC subheader of the MAC CE.

In a possible design, the indication information includes an LCID.

In a possible design, the indication information is located in a payload of the MAC CE.

In a possible design, the MAC CE further includes one or more pieces of the following information:
identification information of the hybrid automatic repeat request HARQ process associated with the second uplink resource;
location information of the second uplink resource;
an identifier or a priority of a logical channel LCH with a highest priority in a second MAC PDU; or
SR information associated with an LCH with a highest priority in a second MAC PDU, where the second MAC PDU is a MAC PDU formed for the second uplink resource.

In a possible design, the indication information includes a bit of a MAC subheader of the first MAC PDU.

In a possible design, the indication information is carried in UCI.

In a possible design, that the terminal determines that a priority of a first uplink resource is higher than a priority of a second uplink resource includes: A MAC entity of the terminal determines that the priority of the first uplink resource is higher than the priority of the second uplink resource. Based on this design, that the terminal sends indication information to the network device includes: The MAC entity of the terminal indicates a physical layer PHY entity to send the UCI to the network device.

In a possible design, that the terminal determines that a priority of a first uplink resource is higher than a priority of a second uplink resource includes: A PHY entity of the terminal determines that the priority of the first uplink resource is higher than the priority of the second uplink resource. Based on this design, that the terminal sends indication information to the network device includes: The PHY entity of the terminal sends the UCI to the network device.

In a possible design, the UCI further includes one or more pieces of the following information:
identification information of the HARQ process associated with the second uplink resource;
location information of the second uplink resource;
an identifier or a priority of a logical channel LCH with a highest priority in a second MAC PDU; or
SR information associated with an LCH with a highest priority in a second MAC PDU, where the second MAC PDU is a MAC PDU formed for the second uplink resource.

In a possible design, information transmitted on the first uplink resource is used to indicate whether the MAC PDU is formed for the second uplink resource or whether the data is stored in the corresponding buffer for the second uplink resource; or a transmission mode of the first MAC PDU is used to indicate whether the MAC PDU is formed for the second uplink resource or whether the data is stored in the corresponding buffer for the second uplink resource.

According to an eighth aspect, an embodiment of this application provides another communication method. The method may be applied to a terminal, or may be applied to a chip inside a terminal. The method includes: The terminal determines that a priority of a first uplink resource is higher than a priority of a second uplink resource. The first uplink resource and the second uplink resource have an overlapping part in time domain. The terminal sends a signal to a network device on the overlapping part by using the first uplink resource, and sends a data packet to the network device on a third uplink resource, where the data packet is a data packet generated for the second uplink resource. The third uplink resource is an uplink resource that arrives after the second uplink resource, the third uplink resource and the second uplink resource are associated with a same HARQ process, and the terminal generates no data packet for the third uplink resource.

According to a ninth aspect, an embodiment of this application provides another communication method. The method may be applied to a network device, or may be applied to a chip inside a network device. The method includes: The network device receives a signal sent by a terminal by using a first uplink resource. The first uplink resource and a second uplink resource have an overlapping part in time domain. A priority of the first uplink resource is higher than a priority of the second uplink resource. The network device receives a data packet sent by the terminal on a third uplink resource, where the data packet is a data packet generated for the second uplink resource. The third uplink resource is an uplink resource that arrives after the second uplink resource, the third uplink resource and the second uplink resource are associated with a same HARQ process, and no data packet is generated for the third uplink resource.

According to a tenth aspect, this application provides a communications apparatus, including units or means configured to perform the steps in the eighth aspect or the ninth aspect.

According to an eleventh aspect, this application provides a communications apparatus, including at least one processor and a memory, where the at least one processor is configured to perform the method provided in the eighth aspect or the ninth aspect.

According to a twelfth aspect, this application provides a communications apparatus, including at least one processor and an interface circuit, where the at least one processor is configured to perform the method provided in the eighth aspect or the ninth aspect.

According to a thirteenth aspect, this application provides a communications program. When executed by a processor, the program is used to perform the method provided in the eighth aspect or the ninth aspect.

According to a fourteenth aspect, a program product, for example, a computer-readable storage medium, is provided, where the program product includes the program in the thirteenth aspect.

It can be learned that, in the foregoing aspects, for a scenario in which uplink resources overlap in time domain, when determining to send the signal on the overlapping part by using an uplink resource with a higher priority, the terminal may transmit, by using a resource that arrives in a next period, a MAC PDU formed for an uplink resource with a lower priority, thereby reducing a data packet loss. In addition, according to the method, the terminal does not need to indicate the network device to schedule a new resource, thereby reducing signaling overheads.

In a possible design, the third uplink resource and the second uplink resource are configuration grant resources that arrive in different periods.

In a possible design, the first uplink resource and the second uplink resource are associated with different HARQ processes.

BRIEF DESCRIPTION OF DRAWINGS

FIG. 10a is a schematic diagram of still another indication manner according to an embodiment of this application;

FIG. 10b is a schematic diagram of still another indication manner according to an embodiment of this application;

DESCRIPTION OF EMBODIMENTS

Figure 1:
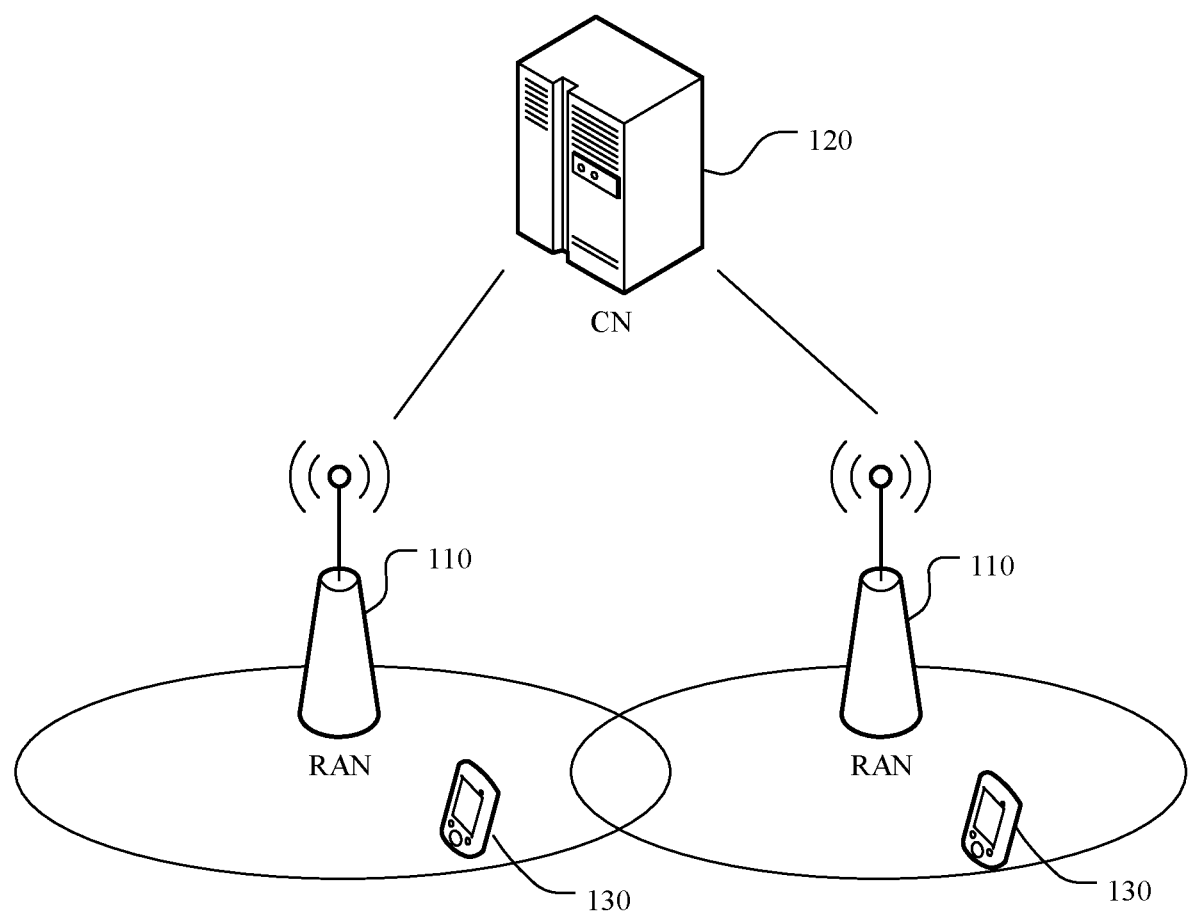
FIG. 1 is a schematic diagram of a communications system to which an embodiment of this application may be applied.

Some terms in this application are first described, to help a person skilled in the art have a better understanding.

(1) A terminal is also referred to as user equipment (UE), a mobile station (MS), a mobile terminal (MT), or the like, and is a device that provides voice and/or data connectivity for a user, for example, a handheld device or a vehicle-mounted device that has a wireless connection function. Currently, examples of some terminals are: a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in a remote medical surgery, a wireless terminal in a smart grid, a wireless terminal in transportation safety, a wireless terminal in a smart city, a wireless terminal in a smart home, and the like.

(2) A network device is a device in a wireless network. For example, the network device may be a radio access network (RAN) node (or device) that enables a terminal to access the wireless network, and may also be referred to as a base station. Currently, examples of some RAN nodes are: a further evolved NodeB (gNB), a transmission reception point (TRP), an evolved NodeB (eNB), a radio network controller (RNC), a NodeB (NB), a base station controller (BSC), a base transceiver station (BTS), a home eNodeB (for example, a home evolved NodeB or a home NodeB, HNB), a baseband unit (BBU), a wireless fidelity (Wi-Fi) access point (AP), and the like. In addition, in a network structure, the network device may include a centralized unit (CU) node, a distributed unit (DU) node, or a RAN device including a CU node and a DU node. The RAN device including a CU node and a DU node splits protocol layers of an eNB in a long term evolution (LTE) system. Functions of some protocol layers are centrally controlled by the CU, functions of some or all of remaining protocol layers are distributed in the DU, and the CU centrally controls the DU. For another example, the network device may be a core network (CN) device that provides service support for the terminal. Common core network devices include an access and mobility management function (AMF) entity, a session management function (SMF) entity, a user plane function (UPF) entity, and the like, which are not listed one by one herein. The AMF entity may be responsible for access management and mobility management of the terminal. The SMF entity may be responsible for session management, for example, establishment of a user session, and the like. The UPF entity may be a functional entity on a user plane, and is mainly responsible for a connection to an external network.

Either the RAN device or the CN device may be used as the network device to perform the method performed by the network device in the embodiments of this application.

(3) An uplink resource scheduling mechanism. The following describes two types of uplink resource scheduling mechanisms. One is dynamic scheduling mechanism. Each time a network device schedules an uplink dynamic grant (DG), the network device indicates, by using downlink control information (DCI), information such as a time-frequency location of a scheduled uplink transmission resource. The other is a configured grant (CG) mechanism. Currently, two types of configured grants are respectively defined as a configured grant type 1 and a configured grant type 2.

Based on the foregoing two uplink resource scheduling manners, scheduled uplink resources may be classified into two types. An uplink resource scheduled in the dynamic scheduling manner is referred to as a DG resource, a DG type resource, or DG. An uplink resource scheduled in the configured grant manner is referred to as a CG resource, a CG type resource, or CG. Names of the uplink resources are not limited in this application.

Parameters of the configured grant type 1 such as a time-frequency resource location, a period of the CG resource, a quantity of hybrid automatic repeat request (HARQ) processes that use the CG resource, and a modulation and coding scheme (MCS) are provided by the network device to the terminal by using radio resource control (RRC) signaling, and are stored by the terminal as a configured uplink grant, so that the terminal may transmit uplink data by using the configured uplink grant. Parameters of the configured grant type 2 such as a period of the CG resource and a quantity of HARQ processes that use the CG resource are provided by the network device to the terminal by using RRC signaling. A time-frequency resource location, an MCS, and the like of the configured grant type 2 are provided by the network device to the terminal by using the DCI, and are stored by the terminal as a configured uplink grant. To be specific, the configured grant type 2 may be activated or deactivated under control of physical layer (PHY) signaling or layer 1 (L1) signaling. When the network device activates the configured grant type 2 by using the DCI, the time-frequency resource location is provided by the network device to the terminal by using the DCI, and is stored by the terminal as the configured uplink grant, so that the terminal may transmit uplink data by using the configured grant.

(4) A resource skip mechanism means that after an uplink resource is configured for a terminal, if the terminal has no proper to-be-transmitted data for the uplink resource, the terminal skips the uplink resource, that is, the terminal generates no MAC PDU for the uplink resource.

If the CG is used to configure the uplink resource for the terminal, when one CG resource is configured for the terminal, if the terminal has no proper to-be-transmitted uplink data for the CG resource, the terminal skips the CG resource, that is, the terminal generates no MAC PDU for the CG resource.

If the uplink resource is configured for the terminal through dynamic scheduling manner, the terminal may configure a skip mechanism for uplink dynamic transmission. For example, a parameter skipUplinkTxDynamic carried in RRC signaling may indicate whether to configure the skip mechanism for the uplink dynamic transmission. When the skip mechanism for the uplink dynamic transmission is configured, if one DG resource is configured for the terminal, and the terminal has no proper to-be-transmitted uplink data for the DG resource, the terminal skips the DG resource, that is, the terminal generates no MAC PDU for the DG resource.

(5) A transport block (TB) is a transport block formed by a MAC PDU at a physical layer, and one TB may include a plurality of bits.

(6) A carrier may be a radio wave used to modulate a to-be-sent signal, for example, a sine wave.

(7) A bandwidth part (BWP) is a resource configured for a terminal in a carrier bandwidth to adapt to a bandwidth capability of the terminal, for example, a group of consecutive or inconsecutive RBs in the carrier bandwidth. A plurality of BWPs may be configured in one carrier. For example, one carrier may be configured with four BWPs.

(8) "A plurality of" means two or more, and another quantifier is similar to this. The term "and/or" describes an association relationship for describing associated objects and represents that three relationships may exist. For example, A and/or B may represent the following three cases: Only A exists, both A and B exist, and only B exists. In addition, an element that appears in singular forms "a", "an", and "the" does not mean "one or only one" unless otherwise specified in the context, but means "one or more". For example, "a device" means one or more such devices. Further, "at least one" means one or any combination of subsequent associated objects. For example, "at least one of A, B, and C" includes A, B, C, AB, AC, BC, or ABC.

It should be noted that, in descriptions of this application, words such as "first" and "second" are merely used for distinction and description, and shall not be understood as an indication or implication of relative importance or an indication or implication of an order.

The following further describes the technical solutions of this application in detail with reference to the accompanying drawings of this specification.

FIG. 1 is a schematic diagram of a communications system to which an embodiment of this application may be applied. As shown in FIG. 1, a terminal 130 may access a wireless network, to obtain a service from an external network (for example, the internet) over the wireless network or communicate with another device over the wireless network, for example, may communicate with another terminal. The wireless network includes a RAN 110 and a CN 120. The RAN 110 is used to connect the terminal 130 to the wireless network, and the CN 120 is used to manage the terminal and provide a gateway for communicating with the external network. It should be understood that a quantity of devices in the communications system shown in FIG. 1 is merely used as an example. This embodiment of this application is not limited thereto. In actual application, the communications system may further include more terminals 130 and more RANs 110, and may further include another device.

A type of the communications system shown in FIG. 1 is not limited in this application. For example, the communications system may be an LTE system, or may be an NR system, or certainly may be a future communications system.

The CN 120 may include a plurality of CN devices. When the communications system shown in FIG. 1 is the NR system, the CN 120 may include an AMF entity, a UPF entity, an SMF entity, or the like. When the communications system shown in FIG. 1 is the LTE system, the CN 120 may include a mobility management entity (MME), a serving gateway (S-GW), or the like.

Figure 2:
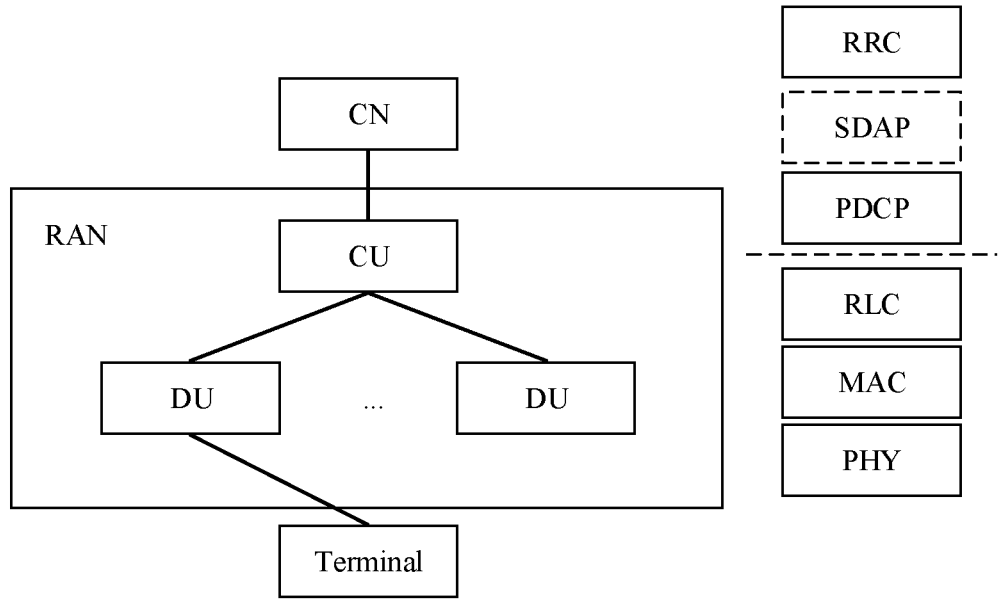
FIG. 2 is a schematic diagram of a network architecture according to an embodiment of this application.

FIG. 2 is a schematic diagram of a network architecture according to an embodiment of this application. As shown in FIG. 2, the network architecture includes a CN device and a RAN device. The RAN device includes a baseband apparatus and a radio frequency apparatus. The baseband apparatus may be implemented by one node, or may be implemented by a plurality of nodes. The radio frequency apparatus may be independently implemented remotely from the baseband apparatus, or may be integrated into the baseband apparatus, or some remote parts are integrated into the baseband apparatus. For example, in an LTE system, a RAN device (eNB) includes a baseband apparatus and a radio frequency apparatus. The radio frequency apparatus may be remotely disposed relative to the baseband apparatus. For example, a remote radio unit (remote radio unit, RRU) is remotely disposed relative to a BBU.

Communication between the RAN device and a terminal complies with a specific protocol layer structure. For example, a control plane protocol layer structure may include functions of protocol layers such as a radio resource control (RRC) layer, a packet data convergence protocol (PDCP) layer, a radio link control (RLC) layer, a media access control (MAC) layer, and a physical layer. A user plane protocol layer structure may include functions of protocol layers such as the PDCP layer, the RLC layer, the MAC layer, and the physical layer. In an implementation, a service data adaptation (SDAP) layer is further included above the PDCP layer.

The RAN device may implement the functions of the protocol layers such as the RRC layer, the PDCP layer, the RLC layer, and the MAC layer by using one node, or may implement the functions of these protocol layers by using a plurality of nodes. For example, in an evolved structure, the RAN device may include a centralized unit (CU), and a distributed unit (DU), and a plurality of DUs may be centrally controlled by one CU. As shown in FIG. 2, the CU and the DU may be divided based on a protocol layer of a wireless network. For example, functions of the PDCP layer and a layer above the PDCP layer are set on the CU, and functions of protocol layers below the PDCP, such as the RLC layer and the MAC layer, are set on the DU.

Division into the protocol layers is merely an example, and division may alternatively be performed at another protocol layer, for example, the RLC layer. Functions of the RLC layer and a protocol layer above the RLC layer are set on the CU, and a function of a protocol layer below the RLC layer is set on the DU. Alternatively, division is performed at a protocol layer. For example, some functions of the RLC layer and a function of a protocol layer above the RLC layer are set on the CU, and a remaining function of the RLC layer and a function of a protocol layer below the RLC layer are set on the DU. In addition, division may alternatively be performed in another manner. For example, division is performed based on a latency. A function whose processing time needs to meet a latency requirement is set on the DU, and a function whose processing time does not need to meet the latency requirement is set on the CU.

In addition, the radio frequency apparatus may not be placed in the DU and is placed remotely from the DU, may be integrated into the DU, or some of the radio frequency apparatus is disposed remotely from the DU, and the other is integrated into the DU. This is not limited herein.

Figure 3:
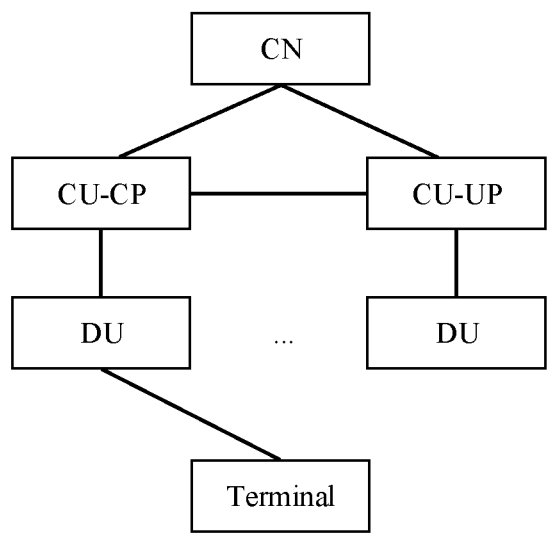
FIG. 3 is a schematic diagram of another network architecture according to an embodiment of this application.

Compared with the network architecture shown in FIG. 2, further referring to FIG. 3, a control plane (CP) and a user plane (UP) of the CU may be separated and implemented by using different entities that are respectively a control plane CU entity (CU-CP entity) and a user plane CU entity (CU-UP entity).

In the foregoing network architecture, signaling generated by the CU may be sent to the terminal by using the DU, or signaling generated by the terminal may be sent to the CU by using the DU. The DU may transparently transmit the signaling to the terminal or the CU by directly encapsulating the signaling at a protocol layer without parsing the signaling. In the following embodiments, if transmission of such signaling between the DU and the terminal is involved, that the DU sends or receives the signaling includes this scenario. For example, signaling at the RRC layer or the PDCP layer is finally processed as signaling at the PHY layer and sent to the terminal, or is converted from received signaling at the PHY layer. In this architecture, it may also be considered that the signaling at the RRC layer or the PDCP layer is sent by the DU, or sent by the DU and the radio frequency apparatus.

In the foregoing embodiments, the CU may be classified as a network device on a RAN side. In addition, the CU may alternatively be classified as a network device on a CN side. This is not limited herein.

An apparatus in the following embodiments of this application may be located in the terminal or a network device based on functions implemented by the apparatus. When the foregoing CU-DU structure is used, the network device may be a CU node, a DU node, or a RAN device including a CU node and a DU node.

The communications system shown in FIG. 1 is used as an example. The RAN 110 may use the CG and/or DG mechanism to configure a plurality of uplink resources for the terminal 130. The plurality of uplink resources may overlap or may not overlap in time domain. When the plurality of uplink resources configured for the terminal 130 overlap in time domain, the terminal 130 selects, based on a specific criterion, an uplink resource on which a signal is to be transmitted. The following is used as an example.

Figure 4:
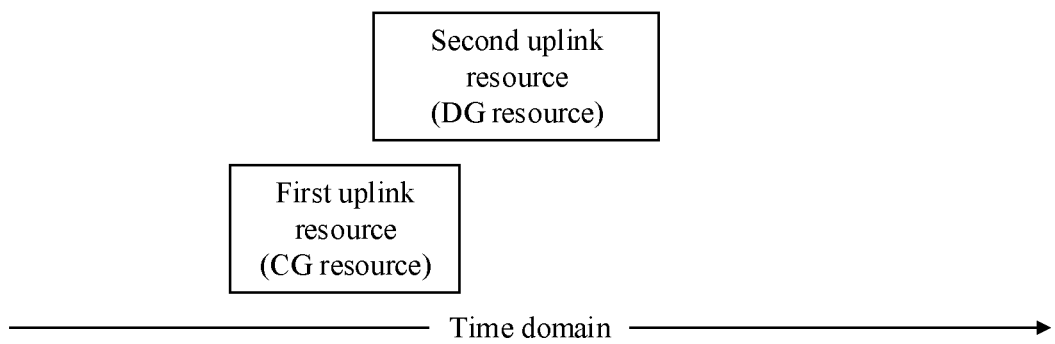
FIG. 4 is a schematic diagram of uplink resource configuration according to an embodiment of this application.

FIG. 4 is a schematic diagram of uplink resource configuration according to an embodiment of this application. FIG. 4 shows an example in which two uplink resources that overlap in time domain are configured for the terminal 130. The two uplink resources that overlap in time domain are respectively a first uplink resource and a second uplink resource. Both the first uplink resource and the second uplink resource may be CG resources or DG resources. It is assumed that in FIG. 4, an example in which the first uplink resource is a CG resource and the second uplink resource is a DG resource is used for illustration. The terminal performs transmission on only one uplink resource on an overlapping part of a plurality of overlapped uplink resources. Therefore, the terminal 130 selects, based on a specific criterion, whether to transmit a signal on the CG resource or the DG resource. In a priority-based criterion, the terminal 130 may select to transmit the signal on a resource with a higher priority in the CG resource and the DG resource. In FIG. 4, it is assumed that a priority of the DG resource is higher than a priority of the CG resource. The terminal 130 may select to transmit the signal on the DG resource. When the terminal 130 processes the uplink resource is an implementation behavior of the terminal 130, that is, there are different cases about an occasion at which the terminal processes the uplink resource during implementation. For example, in a process in which the terminal 130 determines to transmit the signal on the DG resource, when the terminal 130 processes the CG resource, the following cases may exist:

In a first case, the terminal 130 forms a MAC PDU for the CG resource, or the terminal 130 stores a data packet formed for the CG resource in a buffer of a corresponding HARQ process, but does not send the MAC PDU or the data packet by using the CG resource. For example, a MAC entity of the terminal 130 does not obtain information about the DG resource. Therefore, the MAC entity forms the MAC PDU for the CG resource. After forming the MAC PDU, the MAC entity may deliver the MAC PDU to a PHY entity, and the PHY entity may store the MAC PDU in a corresponding buffer. In this case, data in the buffer is the data packet formed for the CG resource. If the PHY entity determines that the priority of the DG resource is higher, the PI-TY entity gives up transmitting the signal on the CG resource. In other words, in this case, although the terminal 130 forms the MAC PDU for the CG resource or stores the data corresponding to the CG resource in the corresponding buffer, the terminal 130 does not send the MAC PDU or the data corresponding to the CG resource by using the CG resource.

In a second case, the terminal 130 forms no MAC PDU for the CG resource, or stores no data packet formed for the CG resource in a corresponding buffer. For example, when the CG resource configured for the terminal 130 arrives, and the terminal 130 has no proper to-be-transmitted data for the CG resource, the terminal 130 skips the CG resource, and generates no MAC PDU based on the CG resource. For another example, if a MAC entity of the terminal 130 determines that a DG resource with a higher priority needs to be used to transmit data subsequently, the MAC entity of the terminal 130 ignores the CG resource, and forms no MAC PDU for the CG resource. For still another example, a MAC entity of the terminal 130 forms the MAC PDU for the CG resource. After the MAC entity forms the MAC PDU, because the priority of the DG resource is higher, the MAC entity does not deliver the MAC PDU to a PHY entity. In this case, the MAC entity stores no data packet formed for the CG resource in the corresponding buffer.

Currently, for the foregoing scenario, in a processing manner, the RAN 110 considers by default that the terminal 130 enables a skip mechanism. When the RAN 110 cannot receive the signal on the CG resource, it is considered that the terminal 130 has no suitable signal to be transmitted on the CG resource. Therefore, retransmission of the CG resource is not scheduled. However, actually, the terminal 130 may not skip the CG resource, but forms the MAC PDU for the CG resource or stores the data corresponding to the CG resource in the corresponding buffer. In this case, if the RAN 110 does not schedule the retransmission of the CG resource, a data loss may occur, and further user experience is affected. In another processing manner, for the foregoing scenario, the RAN 110 is configured to schedule retransmission of the CG resource. However, actually, the terminal 130 may not form the MAC PDU for the CG resource or may not store the data in the corresponding buffer for the CG resource. In this case, if the RAN 110 schedules the retransmission of the CG resource, signaling overheads are increased, and retransmission resources are wasted.

In view of the foregoing existing problems, an embodiment of this application provides a communication method.

In the method, for a scenario in which uplink resources overlap in time domain, when a terminal determines to use an uplink resource with a higher priority to send a signal on an overlapping part, the terminal may indicate, to a network device, whether a MAC PDU is formed for an uplink resource with a lower priority or whether data is stored in a corresponding buffer for an uplink resource with a lower priority. In this way, the network device may determine, according to the indication of the terminal, whether the terminal forms the MAC PDU for the uplink resource with the lower priority or whether the terminal stores the data in the corresponding buffer for the uplink resource with the lower priority. If the network device determines, according to the indication of the terminal, that the MAC PDU is formed for the uplink resource with the lower priority, the network device may schedule a resource to transmit or retransmit the MAC PDU. If the network device determines, according to the indication of the terminal, that the data is stored in the corresponding buffer for the uplink resource with the lower priority, the network device may schedule a resource to transmit or retransmit the data. If the network device determines, according to the indication of the terminal, that no MAC PDU is formed for the uplink resource with the lower priority or that no data is stored in the corresponding buffer for the uplink resource with the lower priority, the network device does not need to schedule a resource to transmit or retransmit data buffered in a HARQ process associated with the uplink resource with the lower priority.

The method provided in this embodiment of this application may be applied to an NR system, an LTE system, an LTE vehicle-to-everything (V2X) system, an NR vehicle-to-everything system, a next-generation wireless local area network system, or an integrated access backhaul (IAB) system. This is not limited in this application.

Figure 5:
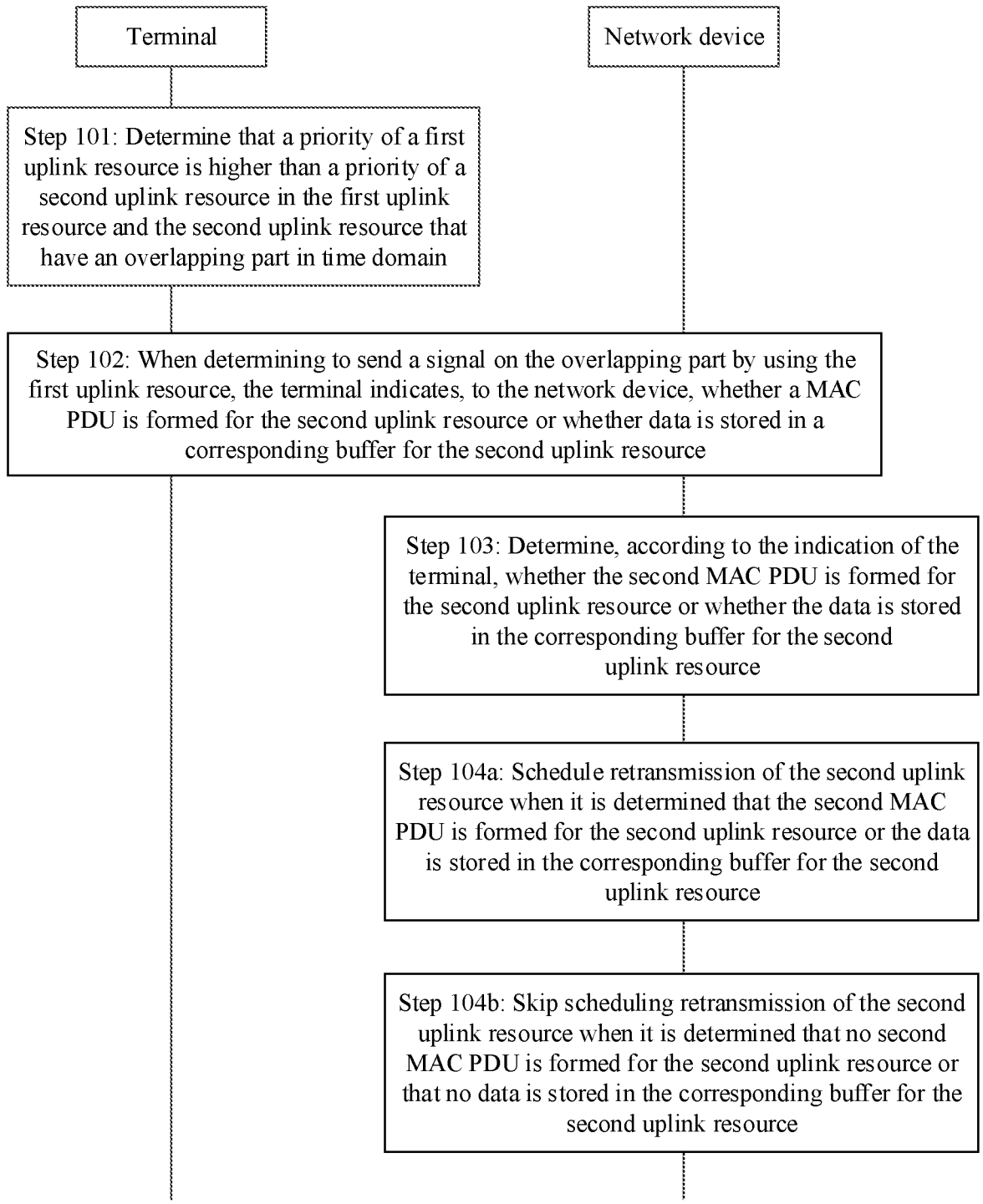
FIG. 5 is an implementation flowchart of a communication method according to an embodiment of this application.

FIG. 5 is an implementation flowchart of a communication method according to an embodiment of this application. As shown in FIG. 5, the method includes the following steps.

Step 101: A terminal determines that a priority of a first uplink resource is higher than a priority of a second uplink resource in the first uplink resource and the second uplink resource that have an overlapping part in time domain. In this embodiment of this application, the first uplink resource and the second uplink resource may overlap or may not overlap in frequency domain. The first uplink resource and the second uplink resource may be resources on different BWPs on a same carrier, or may be resources on a same BWP on a same carrier. The first uplink resource may be a DG resource or a CG resource, and the second uplink resource may also be a DG resource or a CG resource. In addition, both the first uplink resource and the second uplink resource may be CG resources, or may be DG resources, or one is a CG resource and the other is a DG resource.

Figure 6A:
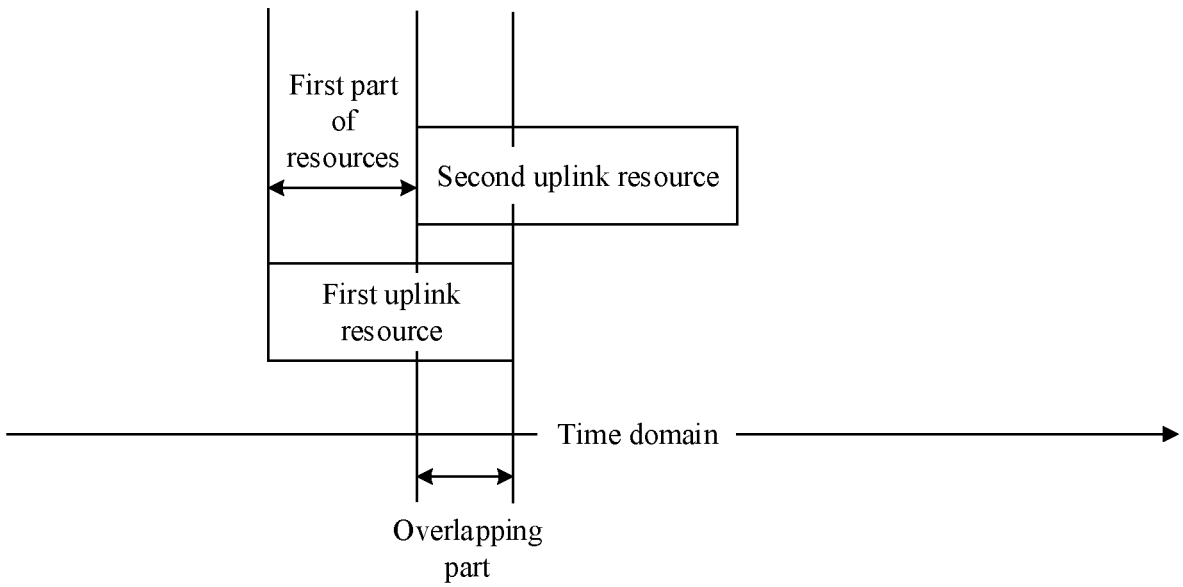
FIG. 6a shows an overlapping part according to an embodiment of this application.
Figure 6B:
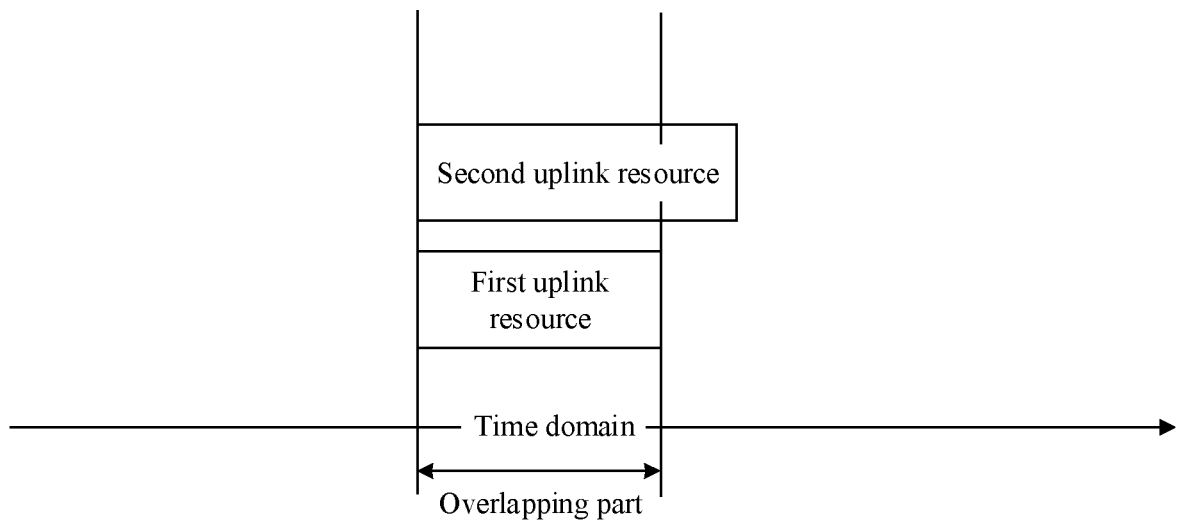
FIG. 6b shows another overlapping part according to an embodiment of this application.

The overlapping part may include all or some resources of the first uplink resource and/or the second uplink resource in time domain. FIG. 6a and FIG. 6b show two overlapping parts according to an embodiment of this application. The overlapping part in FIG. 6a includes some resources of the first uplink resource or the second uplink resource in time domain. The overlapping part in FIG. 6b includes all resources of the first uplink resource in time domain, or some resources of the second uplink resource in time domain.

In this embodiment of this application, a MAC entity or a PHY entity of the terminal may determine that the priority of the first uplink resource is higher than the priority of the second uplink resource.

If the MAC entity of the terminal determines that the priority of the first uplink resource is higher than the priority of the second uplink resource, the MAC entity of the terminal may determine, by using, but not limited to, any one of the following three methods or any combination of the following three methods, that the priority of the first uplink resource is higher than the priority of the second uplink resource.

Method 1: The MAC entity of the terminal may determine the priorities of the first uplink resource and the second uplink resource based on scheduling/arrival moments of the first uplink resource and the second uplink resource. When it is determined that the scheduling/arrival moment of the first uplink resource is later than the scheduling/arrival moment of the second uplink resource, it may be determined that the priority of the first uplink resource is higher than the priority of the second uplink resource.

Method 2: The MAC entity of the terminal may determine the priorities of the first uplink resource and the second uplink resource based on priorities indicated by priority indications in scheduling commands or configuration commands of the first uplink resource and the second uplink resource. When the priority indicated by the priority indication in the scheduling command or the configuration command of the first uplink resource is determined to be higher than the priority indicated by the priority indication in the priority indication in the scheduling command or the configuration command of the second uplink resource, it may be determined that the priority of the first uplink resource is higher than the priority of the second uplink resource. For example, it is assumed that the first uplink resource is a CG resource, and the second uplink resource is a DG resource. When the MAC entity of the terminal determines that a priority indicated by a priority indication in a configuration command of the CG resource is higher than a priority indicated by a priority indication in a scheduling command of the DG resource, it may be determined that the priority of the first uplink resource is higher than the priority of the second uplink resource.

Method 3: The MAC entity of the terminal may determine the priorities of the first uplink resource and the second uplink resource based on highest priorities of logical channels (LCH) to which data that can be transmitted on the first uplink resource and the second uplink resource belongs. When it is determined that the highest priority of the LCH to which the data that can be transmitted on the first uplink resource is higher than the highest priority of the LCH to which the data that can be transmitted on the second uplink resource, it may be determined that the priority of the first uplink resource is higher than the priority of the second uplink resource.

If the PHY entity of the terminal determines that the priority of the first uplink resource is higher than the priority of the second uplink resource, the PHY entity of the terminal may further use the following method 4 in addition to any one or a combination of Method 1 to Method 3. Certainly, the PHY entity of the terminal may alternatively use any combination of Method 1 to Method 4.

Method 4: The PHY entity of the terminal may determine the priorities of the first uplink resource and the second uplink resource based on priority indication information of the first uplink resource and the second uplink resource that is sent by the MAC entity. For example, when the MAC entity determines that the priority of the first uplink resource is higher than the priority of the second uplink resource, the MAC entity may send priority indication information to the PHY entity, where the priority indication information is used to indicate that the priority of the first uplink resource is higher than the priority of the second uplink resource. In this case, the PHY entity may determine, based on the priority indication information, that the priority of the first uplink resource is higher than the priority of the second uplink resource. Alternatively, when the MAC entity of the terminal delivers a MAC PDU to the PHY entity or indicates the PHY entity to transmit data, to indicate priority information of the MAC PDU or priority information of an uplink transmission resource corresponding to the MAC PDU. The PHY entity compares the priority information of the MAC PDU indicated by the MAC entity or the priority information of the uplink transmission resource, to determine which uplink transmission resource has a higher priority.

It may be understood that if the method provided in this embodiment of this application is applied to a network architecture shown in FIG. 1, the terminal in this embodiment of this application is the terminal 130 in FIG. 1, and a network device is the RAN 110 in FIG. 1.

Step 102: When determining to send a signal on the overlapping part by using the first uplink resource, the terminal indicates, to the network device, whether a MAC PDU is formed for the second uplink resource or whether data is stored in a corresponding buffer for the second uplink resource. The signal in this application may include data and/or control signaling.

In this embodiment of this application, whether the MAC PDU is formed for the second uplink resource includes: The MAC PDU is formed for the second uplink resource or no MAC PDU is formed for the second uplink resource. The MAC PDU formed for the second uplink resource may be understood as a MAC PDU generated for the second uplink resource, or may be understood as a MAC PDU generated based on the second uplink resource, or may be understood as a MAC PDU corresponding to the second uplink resource, or may be understood as a MAC PDU associated with the second uplink resource, or may be understood as a MAC PDU that is to be transmitted on the second uplink resource. An understanding that no MAC PDU is formed for the second uplink resource is similar to this. Correspondingly, whether the data is stored in the corresponding buffer for the second uplink resource includes: The data is stored in the corresponding buffer for the second uplink resource or no data is stored in the corresponding buffer for the second uplink resource. That the data is stored in the corresponding buffer for the second uplink resource may be understood as that data corresponding to the second uplink resource is stored in the corresponding buffer. An understanding that no data is stored in the corresponding buffer for the second uplink resource is similar to this. For example, the data corresponding to the second uplink resource is data after the MAC PDU formed for the second uplink resource is delivered by the MAC entity of the terminal to the PHY entity of the terminal. That the data is stored in the corresponding buffer for the second uplink resource may be understood as that the data after the MAC PDU formed for the second uplink resource is delivered by the MAC entity of the terminal to the PHY entity of the terminal is stored in a corresponding HARQ process, or may be understood that the data after the MAC PDU formed for the second uplink resource is delivered by the MAC entity of the terminal to the PHY entity of the terminal is stored in a buffer of a corresponding HARQ process, or may be understood as that data is stored in a buffer of a corresponding HARQ process before the terminal obtains the second uplink resource.

The foregoing method may further include: The terminal obtains the first uplink resource and the second uplink resource. When the first uplink resource is a DG resource or a CG resource, an obtaining manner of the first uplink resource is the same as that described in Method 3. In other words, the DG resource may be obtained by using downlink control information, and the CG resource may be obtained by using RRC signaling, or the CG resource is obtained by using RRC signaling and downlink control information.

In this embodiment of this application, step 102 corresponds to the following plurality of implementation solutions:

Solution 1: When determining to send the signal on the overlapping part by using the first uplink resource, the terminal indicates, to the network device, that the MAC PDU is formed for the second uplink resource. For example, when determining to send the signal on the overlapping part by using the first uplink resource, and determining that the MAC PDU is formed for the second uplink resource, the terminal indicates, to the network device, that the MAC PDU is formed for the second uplink resource. In the solution 1, the terminal indicates to the network device only when the MAC PDU is formed for the second uplink resource. In this solution, when the network device does not receive the indication from the terminal, it may be considered by default that the terminal forms no MAC PDU for the second uplink resource.

Solution 2: When determining to send the signal on the overlapping part by using the first uplink resource, the terminal indicates, to the network device, that the MAC PDU is formed for the second uplink resource or that no MAC PDU is formed for the second uplink resource. For example, when determining to send the signal on the overlapping part by using the first uplink resource, and determining that the MAC PDU is formed for the second uplink resource, the terminal indicates, to the network device, that the MAC PDU is formed for the second uplink resource. Alternatively, when determining to send the signal on the overlapping part by using the first uplink resource, and determining that no MAC PDU is formed for the second uplink resource, the terminal indicates, to the network device, that no MAC PDU is formed for the second uplink resource. In the solution 2, the terminal not only indicates to the network device when the MAC PDU is formed for the second uplink resource, but also indicates to the network device when no MAC PDU is formed for the second uplink resource. The network device may determine, based on different indications of the terminal, whether the terminal forms the MAC PDU for the second uplink resource.

Solution 3: When determining to send the signal on the overlapping part by using the first uplink resource, the terminal indicates, to the network device, that no MAC PDU is formed for the second uplink resource. For example, when determining to send the signal on the overlapping part by using the first uplink resource, and determining that no MAC PDU is formed for the second uplink resource, the terminal indicates, to the network device, that no MAC PDU is formed for the second uplink resource. In the solution 3, the terminal indicates to the network device only when no MAC PDU is formed for the second uplink resource. In this solution, when the network device does not receive the indication from the terminal, it may be considered by default that the terminal forms the MAC PDU for the second uplink resource.

Solution 4: When determining to send the signal on the overlapping part by using the first uplink resource, the terminal indicates, to the network device, that the data is stored in the corresponding buffer for the second uplink resource. For example, when determining to send the signal on the overlapping part by using the first uplink resource, and determining that the data is stored in the corresponding buffer for the second uplink resource, the terminal indicates, to the network device, that the data is stored in the corresponding buffer for the second uplink resource. In the solution 4, the terminal indicates to the network device only when the data is stored in the corresponding buffer for the second uplink resource. In this solution, when the network device does not receive the indication from the terminal, it may be considered by default that the terminal stores no data in the corresponding buffer for the second uplink resource.

Solution 5: When determining to send the signal on the overlapping part by using the first uplink resource, the terminal indicates, to the network device, that the data is stored in the corresponding buffer for the second uplink resource or that no data is stored in the corresponding buffer for the second uplink resource. For example, when determining to send the signal on the overlapping part by using the first uplink resource, and determining that the data is stored in the corresponding buffer for the second uplink resource, the terminal indicates, to the network device, that the data is stored in the corresponding buffer for the second uplink resource. Alternatively, when determining to send the signal on the overlapping part by using the first uplink resource, and determining that no data is stored in the corresponding buffer for the second uplink resource, the terminal indicates, to the network device, that no data is stored in the corresponding buffer for the second uplink resource. In the solution 5, the terminal not only indicates to the network device when the data is stored in the corresponding buffer for the second uplink resource, but also indicates to the network device when no data is stored in the corresponding buffer for the second uplink resource. The network device may determine, based on different indications of the terminal, whether the terminal stores the data in the corresponding buffer for the second uplink resource.

Solution 6: When determining to send the signal on the overlapping part by using the first uplink resource, the terminal indicates, to the network device, that no data is stored in the corresponding buffer for the second uplink resource. For example, when determining to send the signal on the overlapping part by using the first uplink resource, and determining that no data is stored in the corresponding buffer for the second uplink resource, the terminal indicates, to the network device, that no data is stored in the corresponding buffer for the second uplink resource. In the solution 6, the terminal indicates to the network device only when no data is stored in the corresponding buffer for the second uplink resource. In this solution, when the network device does not receive the indication from the terminal, it may be considered by default that the terminal stores the data in the corresponding buffer for the second uplink resource.

Solution 7: When determining to send the signal on the overlapping part by using the first uplink resource, the terminal indicates, to the network device, that the MAC PDU is formed for the second uplink resource or that the data is stored in the corresponding buffer for the second uplink resource. For example, when determining to send the signal on the overlapping part by using the first uplink resource, and determining that the MAC PDU is formed for the second uplink resource, the terminal indicates, to the network device, that the MAC PDU is formed for the second uplink resource. Alternatively, when determining to send the signal on the overlapping part by using the first uplink resource, and determining that the data is stored in the corresponding buffer for the second uplink resource, the terminal indicates, to the network device, that the data is stored in the corresponding buffer for the second uplink resource. In the solution 7, the terminal indicates to the network device only when the MAC PDU is formed for the second uplink resource or the data is stored in the corresponding buffer for the second uplink resource. In this solution, when the network device does not receive the indication from the terminal, it is considered by default that the terminal forms no MAC PDU for the second uplink resource or stores no data in the corresponding buffer for the second uplink resource.

Solution 8: When determining to send the signal on the overlapping part by using the first uplink resource, the terminal indicates, to the network device, that the MAC PDU is formed for the second uplink resource or that the data is stored in the corresponding buffer for the second uplink resource, or that no MAC PDU is formed for the second uplink resource or that no data is stored in the corresponding buffer for the second uplink resource. For example, when determining to send the signal on the overlapping part by using the first uplink resource, and determining that the MAC PDU is formed for the second uplink resource, the terminal indicates, to the network device, that the MAC PDU is formed for the second uplink resource, or when determining to send the signal on the overlapping part by using the first uplink resource, and determining that the data is stored in the corresponding buffer for the second uplink resource, the terminal indicates, to the network device, that the data is stored in the corresponding buffer for the second uplink resource. Alternatively, when determining to send the signal on the overlapping part by using the first uplink resource, and determining that no MAC PDU is formed for the second uplink resource, the terminal indicates, to the network device, that no MAC PDU is formed for the second uplink resource, or when determining to send the signal on the overlapping part by using the first uplink resource, and determining that no data is stored in the corresponding buffer for the second uplink resource, the terminal indicates, to the network device, that no data is stored in the corresponding buffer for the second uplink resource. In the solution 8, the terminal not only indicates to the network device when the MAC PDU is formed for the second uplink resource or that the data is stored in the corresponding buffer for the second uplink resource, but also indicates to the network device when no MAC PDU is formed for the second uplink resource or that no data is stored in the corresponding buffer for the second uplink resource. The network device may determine, based on different indications of the terminal, whether the terminal forms the MAC PDU for the second uplink resource or stores the data in the corresponding buffer for the second uplink resource.

Solution 9: When determining to send the signal on the overlapping part by using the first uplink resource, the terminal indicates, to the network device, that no MAC PDU is formed for the second uplink resource or that no data is stored in the corresponding buffer for the second uplink resource. For example, when determining to send the signal on the overlapping part by using the first uplink resource, and determining that no MAC PDU is formed for the second uplink resource, the terminal indicates, to the network device, that no MAC PDU is formed for the second uplink resource. Alternatively, when determining to send the signal on the overlapping part by using the first uplink resource, and determining that no data is stored in the corresponding buffer for the second uplink resource, the terminal indicates, to the network device, that no data is stored in the corresponding buffer for the second uplink resource. In the solution 9, the terminal indicates to the network device only when no MAC PDU is formed for the second uplink resource or no data is stored in the corresponding buffer for the second uplink resource. In this solution, when the network device does not receive the indication from the terminal, it may be considered by default that the terminal forms the MAC PDU for the second uplink resource or stores the data in the corresponding buffer for the second uplink resource.

In a possible implementation, before determining to send the signal on the overlapping part by using the first uplink resource, the terminal may form a first MAC PDU for the first uplink resource. Based on this implementation, after forming the first MAC PDU for the first uplink resource, the terminal may further send the first MAC PDU on the overlapping part by using the first uplink resource. It should be noted that, in addition to sending the first MAC PDU on the overlapping part by using the first uplink resource, the terminal may further send the first MAC PDU on a resource included in the first uplink resource other than the overlapping part. For example, FIG. 6a is used as an example. In addition to sending the first MAC PDU on the overlapping part by using the first uplink resource, the terminal may further send the first MAC PDU on a first part of resources included in the first uplink resource other than the overlapping part. In other words, the terminal may send the first MAC PDU on the entire first uplink resource.

It should be noted that, in this embodiment of this application, to distinguish from the first MAC PDU formed for the first uplink resource, a MAC PDU formed for the second uplink resource is described as a second MAC PDU below.

In a possible design, a HARQ process associated with the first uplink resource is different from a HARQ process associated with the second uplink resource. According to the method in this design, invalid scheduling performed by the network device can be reduced. For example, in some possible scenarios, the first uplink resource and the second uplink resource that are generated by the terminal may be associated with a same HARQ process. In these scenarios, after the terminal separately forms the first MAC PDU and the second MAC PDU for the first uplink resource and the second uplink resource, the MAC entity of the terminal delivers the first MAC PDU and the second MAC PDU to the PHY entity of the terminal, and the first MAC PDU and the second MAC PDU at a PHY layer of the terminal need to wait to be sent in a buffer of the same HARQ process. In this case, because the terminal generates the second MAC PDU for the second uplink resource, the network device may schedule a resource to transmit or retransmit the second MAC PDU. However, because the first MAC PDU and the second MAC PDU need to wait to be sent in the buffer of the same HARQ process, the second MAC PDU may be covered by the first MAC PDU. If the second MAC PDU is covered by the first MAC PDU, the scheduling performed by the network device is invalid scheduling. According to the method in this design, when the HARQ process associated with the first uplink resource is different from the HARQ process associated with the second uplink resource, the method provided in this application can be performed to effectively reduce invalid scheduling performed by the network device.

Step 103: The network device determines, according to the indication of the terminal, whether the second MAC PDU is formed for the second uplink resource or whether the data is stored in the corresponding buffer for the second uplink resource.

Step 104a: The network device schedules retransmission of the second uplink resource when the network device determines that the second MAC PDU is formed for the second uplink resource or the data is stored in the corresponding buffer for the second uplink resource. For example, if the network device determines, according to the indication of the terminal, that the MAC PDU is formed for the second uplink resource, the network device may schedule a resource to transmit or retransmit the MAC PDU. If the network device determines, according to the indication of the terminal, that the data is stored in the corresponding buffer for the second uplink resource, the network device may schedule a resource to transmit or retransmit the data.

Step 104b: The network device skips scheduling retransmission of the second uplink resource when the network device determines that no second MAC PDU is formed for the second uplink resource or that no data is stored in the corresponding buffer for the second uplink resource. For example, if the network device determines, according to the indication of the terminal, that no MAC PDU is formed for the second uplink resource or that no data is stored in the corresponding buffer for the second uplink resource, the network device does not need to schedule one resource to transmit or retransmit data buffered in the HARQ process associated with the second uplink resource.

For a scenario in which uplink resources overlap in time domain, according to the foregoing method provided in this embodiment of this application, when the terminal determines to send a signal on an overlapping part by using an uplink resource with a higher priority, the terminal may indicate, to the network device, whether a MAC PDU is formed for an uplink resource with a lower priority or whether data is stored in a corresponding buffer for an uplink resource with a lower priority. In this case, when the terminal forms the MAC PDU for the uplink resource with the lower priority or stores the data in the corresponding buffer for the uplink resource with the lower priority, the network device may schedule a resource to transmit or retransmit the MAC PDU formed for the uplink resource with the lower priority or the data, thereby further reducing a data loss and ensuring user experience. In addition, according to the method, when the terminal forms no MAC PDU for the uplink resource with the lower priority or stores no data in the corresponding buffer for the uplink resource with the lower priority, the network device does not need to schedule a resource to transmit or retransmit data buffered in a HARQ process associated with the uplink resource with the lower priority, thereby reducing signaling overheads and saving retransmission resources.

In this embodiment of this application, the terminal may indicate, to the network device in an explicit indication manner or an implicit indication manner, whether the MAC PDU is formed for the second uplink resource or whether the data is stored in the corresponding buffer for the second uplink resource. A manner used by the terminal for indication is not limited in this application. The following describes in detail how the terminal indicates, to the network device in the explicit indication manner or the implicit indication manner, whether the MAC PDU is formed for the second uplink resource or whether the data is stored in the corresponding buffer for the second uplink resource.

First type: The terminal indicates, to the network device in the explicit indication manner, whether the MAC PDU is formed for the second uplink resource or whether the data is stored in the corresponding buffer for the second uplink resource.

In the explicit indication manner, the terminal sends indication information to the network device, to indicate, by using the indication information, whether the MAC PDU is formed for the second uplink resource or whether the data is stored in the corresponding buffer for the second uplink resource.

In the explicit indication manner, the indication information sent by the terminal to the network device may be carried in different information. For example, the indication information may be carried in a media access control control element (MAC CE). For another example, the indication information may alternatively be carried in any MAC subheader included in the first MAC PDU. For still another example, the indication information may alternatively be carried in uplink control information (UCI). The following describes in detail different explicit indication manners.

In an explicit indication manner 1, the indication information is carried in the MAC CE. The MAC CE may be carried in the first MAC PDU. Certainly, the MAC CE may alternatively be carried in another MAC PDU. This is not limited in this application. According to an indication method in the manner 1, the network device may properly schedule the retransmission of the second uplink resource by using the indication information carried in the MAC CE carried in the received first MAC PDU. When the indication information indicates that the MAC PDU is formed for the second uplink resource or that the data is stored in the corresponding buffer for the second uplink resource, the network device schedules a resource to transmit or retransmit the MAC PDU formed for the second uplink resource or the data, thereby reducing a data loss. When the indication information indicates that no MAC PDU is formed for the second uplink resource or that no data is stored in the corresponding buffer for the second uplink resource, the network device may not schedule a resource to transmit or retransmit the data buffered in the HARQ process associated with the second uplink resource, thereby reducing the signaling overheads and saving the retransmission resources. In this way, resource utilization can be improved.

It should be noted that, in this embodiment of this application, only an example in which two uplink resources overlap is used for description. When a plurality of uplink resources overlap, the method provided in this application may also be used for indication.

Based on the foregoing explicit indication manner 1, in a possible implementation, there are a plurality of second uplink resources, that is, there are a plurality of uplink resources that overlap with the first uplink resource. In this case, indication information corresponding to each of the plurality of second uplink resources may be carried in a same MAC CE or different MAC CEs. For example, three uplink resources overlap. The three uplink resources are respectively an uplink resource A, an uplink resource B, and an uplink resource C. A priority of the uplink resource A is higher than priorities of the uplink resource B and the uplink resource C. It is assumed that a MAC PDU 1 is generated by the terminal for the uplink resource A or a MAC PDU 1 generated by the terminal for the uplink resource A is stored in a buffer corresponding to a HARQ, a MAC PDU 2 is generated by the terminal for the uplink resource B or a MAC PDU 2 generated by the terminal for the uplink resource B is stored in a buffer corresponding to a HARQ, and a MAC PDU 3 is generated for the uplink resource C or a MAC PDU 3 generated for the uplink resource C is stored in a buffer corresponding to a HARQ. The terminal may preferentially send the MAC PDU 1. Based on this example, if the solution 7 provided in this application is used, the terminal may generate indication information 1 for the uplink resource B, where the indication information 1 is used to indicate that the MAC PDU 2 is generated for the uplink resource B or that the MAC PDU 2 generated for the uplink resource B is stored in the buffer corresponding to the HARQ, and the terminal may generate indication information 2 for the uplink resource C, where the indication information 2 is used to indicate that the MAC PDU 3 is generated for the uplink resource C or the MAC PDU 3 generated for the uplink resource C is stored in the buffer corresponding to the HARQ. For this example, the terminal may separately generate, for the uplink resource B and the uplink resource C, MAC CEs corresponding to the uplink resource B and the uplink resource C. For example, the terminal may generate a MAC CE 1, by using which the indication information 1 is carried, for the uplink resource B, and generate a MAC CE 2, by using which the indication information 2 is carried, for the uplink resource C. Certainly, the terminal may also generate one MAC CE 3, by using which the indication information 1 and the indication information 2 are carried, for the uplink resource B and the uplink resource C.

Based on the foregoing explicit indication manner 1, the MAC CE that carries the indication information may include only a MAC subheader, or may include a MAC subheader and a payload.

Figure 7:
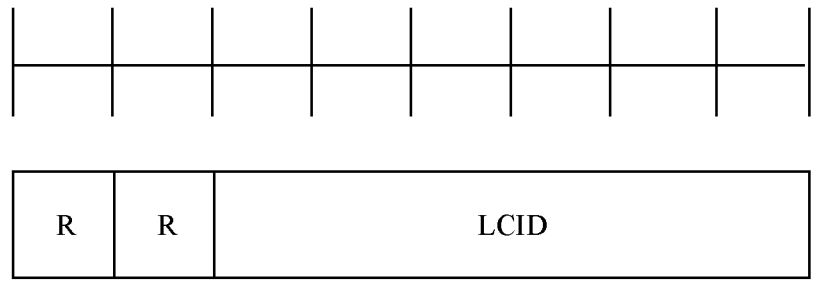
FIG. 7 is a schematic diagram of a MAC subheader of a MAC CE according to an embodiment of this application.

In a possible design, when the MAC CE that carries the indication information includes only the MAC subheader, the indication information is located in the MAC subheader of the MAC CE. Referring to FIG. 7, when the indication information is located in the MAC subheader of the MAC CE, the indication information may be a logical channel identifier (LCID) included in the MAC subheader of the MAC CE. The LCID includes six bits, and the six bits may indicate values of 0 to 63. Currently, the six bits included in the LCID indicate that 0 to 32 and 52 to 63 are already used. Therefore, in this application, the six bits included in the LCID may indicate any value in 33 to 51, and indicate whether the MAC PDU is formed for the second uplink resource or whether the data is stored in the corresponding buffer for the second uplink resource. For example, when the six bits included in the LCID may indicate 33, to be specific, when a value of the six bits of the LCID is 100001, it indicates that the MAC PDU is formed for the second uplink resource or that the data is stored in the corresponding buffer for the second uplink resource. For another example, when the six bits included in the LCID may indicate 33, to be specific, when a value of the six bits of the LCID is 100001, it indicates that the MAC PDU is formed for the second uplink resource or that the data is stored in the corresponding buffer for the second uplink resource. In addition, when the six bits included in the LCID may indicate 34, to be specific, when the value of the six bits of the LCID is 100010, it indicates that no MAC PDU is formed for the second uplink resource or that no data is stored in the corresponding buffer for the second uplink resource.

In another possible design, when the MAC CE that carries the indication information includes the MAC subheader and the payload, the indication information may be located in the MAC subheader of the MAC CE or the payload of the MAC CE.

When the indication information is located in the payload of the MAC CE, the indication information may be a bit in the payload of the MAC CE. For example, when there is one second uplink resource, the indication information may be one bit in the payload of the MAC CE. A value of the bit being 0 or 1 indicates whether the MAC PDU is formed for the second uplink resource or whether the data is stored in the corresponding buffer for the second uplink resource. For example, when the value of the bit is 1, it may indicate that the MAC PDU is formed for the second uplink resource or that the data is stored in the corresponding buffer for the second uplink resource. When the value of the bit is 0, it may indicate that no MAC PDU is formed for the second uplink resource or that no data is stored in the corresponding buffer for the second uplink resource. For another example, when the value of the bit is 0, it may indicate that the MAC PDU is formed for the second uplink resource or that the data is stored in the corresponding buffer for the second uplink resource. When the value of the bit is 1, it may indicate that no MAC PDU is formed for the second uplink resource or that no data is stored in the corresponding buffer for the second uplink resource. For example, when there are a plurality of second uplink resources, and indication information corresponding to each of the plurality of second uplink resources is carried in the same MAC CE, the indication information may be a plurality of bits in the payload of the MAC CE, and values of the plurality of bits are used to indicate whether the MAC PDU is formed for the second uplink resource or whether the data is stored in the corresponding buffer for the second uplink resource. For example, when there are three second uplink resources: a second uplink resource A, a second uplink resource B, and a second uplink resource C, the indication information may be three bits in the payload of the MAC CE: a bit A, a bit B, and a bit C. A value of the bit A may indicate whether a MAC PDU is formed for the second uplink resource A or whether data is stored in a corresponding buffer for the second uplink resource A. A value of the bit B may indicate whether a MAC PDU is formed for the second uplink resource B or whether data is stored in a corresponding buffer for the second uplink resource B. A value of the bit C may indicate whether a MAC PDU is formed for the second uplink resource C or whether data is stored in a corresponding buffer for the second uplink resource C.

Based on the explicit indication manner 1, in a possible implementation, when forming the MAC PDU for the second uplink resource or storing the data in the corresponding buffer for the second uplink resource, the terminal sends, to the network device, the MAC CE that carries the indication information. When forming no MAC PDU for the second uplink resource or storing no data in the corresponding buffer for the second uplink resource, the terminal does not send, to the network device, the MAC CE that carries the indication information. The network device may determine, based on whether the terminal sends the MAC CE that carries the indication information, whether the terminal forms the MAC PDU for the second uplink resource or whether the terminal stores the data in the corresponding buffer for the second uplink resource, to properly schedule the retransmission of the second uplink resource.

Based on the explicit indication manner 1, in another possible implementation, when the terminal forms the MAC PDU for the second uplink resource or stores the data in the corresponding buffer for the second uplink resource, or when the terminal forms no MAC PDU for the second uplink resource or stores no data in the corresponding buffer for the second uplink resource, the terminal sends, to the network device, the MAC CE that carries the indication information, and may use the bit in the LCID in the MAC subheader of the MAC CE or in the payload of the MAC CE, to indicate whether the MAC PDU is formed for the second uplink resource or whether the data is stored in the corresponding buffer for the second uplink resource. The network device may determine, based on a value/status, sent by the terminal, of the bit in the LCID in the MAC subheader of the MAC CE or in the payload of the MAC CE, whether the terminal forms the MAC PDU for the second uplink resource or whether the terminal stores the data in the corresponding buffer for the second uplink resource, to properly schedule the retransmission of the second uplink resource.

In this embodiment of this application, the MAC CE that carries the indication information may further include one or more pieces of the following information:

Item 1: Identification information of the HARQ process associated with the second uplink resource. The identification information of the HARQ process may include an ID of the HARQ process. When there are a plurality of second uplink resources, and indication information corresponding to each of the plurality of second uplink resources is carried in a same MAC CE, the identification information of the HARQ process may include an ID of a HARQ process associated with each of the plurality of second uplink resources or index values corresponding to all HARQ processes in the plurality of second uplink resources that are sorted in ascending order or in descending order. When there are a plurality of second uplink resources, and indication information corresponding to each of the plurality of second uplink resources is carried in a different MAC CE, identification information of a HARQ process associated with each second uplink resource may include an ID of the HARQ process or index values corresponding to all HARQ processes of the HARQ process in the plurality of second uplink resources that are sorted in ascending order or in descending order.

For example, three uplink resources overlap. The three uplink resources are respectively an uplink resource A, an uplink resource B, and an uplink resource C. A priority of the uplink resource A is higher than priorities of the uplink resource B and the uplink resource C. It may be understood that, in this example, the uplink resource A is the first uplink resource in this application, and the uplink resource B and the uplink resource C each are the second uplink resource in this application. This is equivalent to that a quantity of second uplink resources is 2. It is assumed that IDs of HARQ processes associated with the uplink resource B and the uplink resource C are respectively 6 and 8. In this case, index values that correspond to the HARQ processes associated with the uplink resource B and the uplink resource C and that are sorted in ascending order are respectively 1 and 2. The terminal may carry, in a MAC CE generated for the uplink resource B, the index value 1 corresponding to the HARQ process associated with the uplink resource B. The terminal may alternatively carry, in a MAC CE generated for the uplink resource C, the index value 2 corresponding to the HARQ process associated with the uplink resource C. Certainly, the terminal may alternatively carry, in MAC CEs generated for the uplink resource B and the uplink resource C, the index value 1 corresponding to the HARQ process associated with the uplink resource B and the index value 2 corresponding to the HARQ process associated with the uplink resource C.

Item 2: Location information of the second uplink resource For example, the location information may include a time point of a start moment of the second uplink resource, for example, indexes of a system frame number (SFN), a slot, and/or a symbol. In other words, the location information may include the SFN, the slot, or the symbol, or include the SFN and the slot, or include the SFN and the symbol, or include the SFN, the slot, and the symbol. When there are a plurality of second uplink resources, and indication information corresponding to each of the plurality of second uplink resources is carried in a same MAC CE, the location information of the second uplink resource may include a time point of a start moment of each of the plurality of second uplink resources or an index value corresponding to a start moment of each of the plurality of second uplink resources that is sorted in a time sequence. When there are a plurality of second uplink resources, and indication information corresponding to each of the plurality of second uplink resources is carried in a different MAC CE, location information of each second uplink resource includes a time point of a start moment of the second uplink resource or an index value corresponding to a time point of a start moment of the second uplink resource that is obtained after start moments of the plurality of second uplink resources are sorted in a time sequence.

Item 3: Identifier or priority of a logical channel (LCH) with a highest priority in the second MAC PDU.

Item 4: SR information associated with the LCH with the highest priority in the second MAC PDU. For example, the SR information may include information such as an SR configuration ID.

Based on the foregoing explicit indication manner 1, a priority of the MAC CE that carries the indication information may be predefined, or a priority of the MAC CE may be configured by using RRC signaling/SIB signaling. For example, it may be predefined that the priority of the MAC CE is higher than a priority of data of any LCH, but is lower than a priority of an existing MAC CE. For another example, the priority of the MAC CE may be configured to be higher than priorities of some/all existing MAC CEs by using the RRC signaling/SIB signaling. For still another example, the priority of the MAC CE may be predefined, or the priority of the MAC CE may be configured to be higher than a priority of data of some LCHs by using the RRC signaling/ SIB signaling.

Figure 8A:
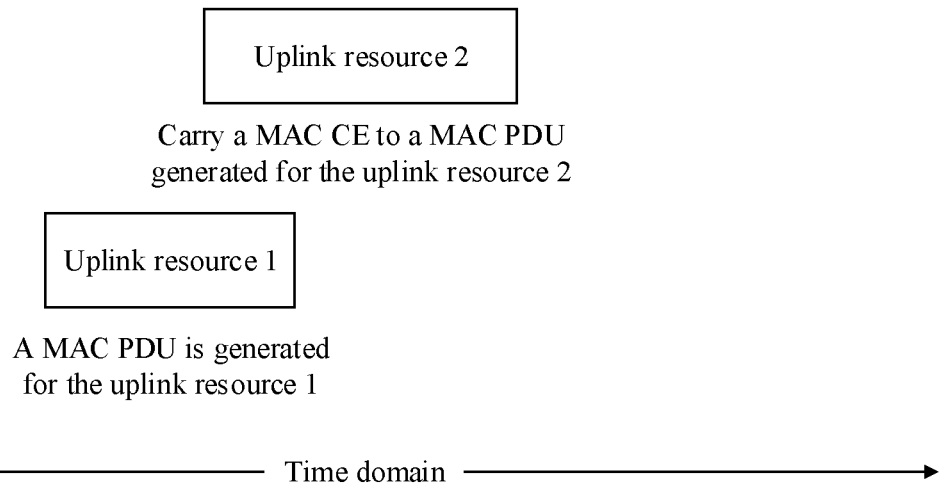
FIG. 8a is a schematic diagram of an indication manner according to an embodiment of this application.
Figure 8B:
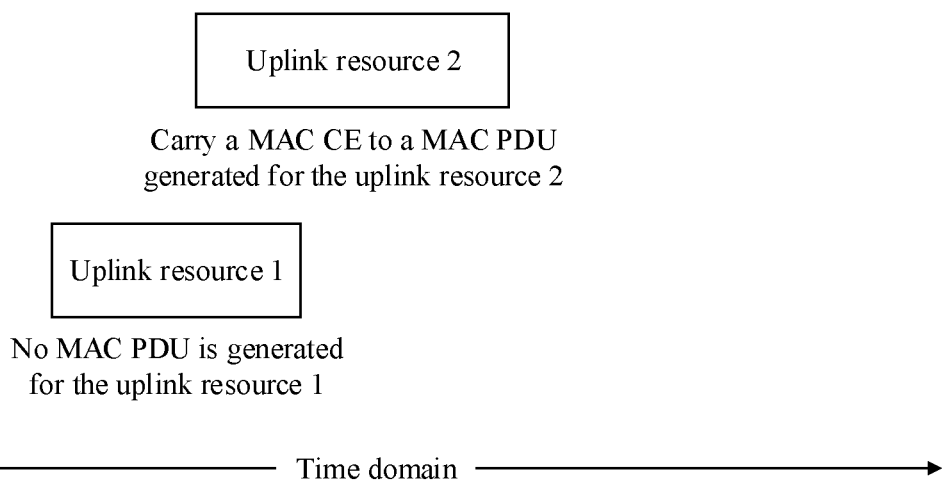
FIG. 8b is a schematic diagram of another indication manner according to an embodiment of this application.

The following describes the foregoing explicit indication manner 1 by using an example. FIG. 8a and FIG. 8b are schematic diagrams of an indication manner according to an embodiment of this application. FIG. 8a and FIG. 8b show an example in which two uplink resources that have an overlapping part in time domain are configured for the terminal. The two uplink resources that have the overlapping part in time domain are respectively an uplink resource 1 and an uplink resource 2. Both the uplink resource 1 and the uplink resource 2 may be CG resources or DG resources. It is assumed that a priority of the uplink resource 2 is higher than a priority of the uplink resource 1, the uplink resource 1 is used for new transmission or retransmission, and the uplink resource 2 is used for new transmission. In FIG. 8a and FIG. 8b, an example in which a start moment of the uplink resource 2 is later than a start moment of the uplink resource 1 is used for illustration. Actually, the start moment of the uplink resource 2 may alternatively be the same as or earlier than the start moment of the uplink resource 1. The following separately describes the two scenarios shown in FIG. 8a and FIG. 8b.

In FIG. 8a, an example in which a MAC entity of the terminal performs the method provided in this application is used for description. In a possible implementation, in a process of processing the uplink resource 2, if the MAC entity of the terminal determines that the priority of the uplink resource 2 is higher than the priority of the uplink resource 1, a MAC PDU is formed by the terminal for the uplink resource 1 or data corresponding to a MAC PDU formed by the terminal for the uplink resource 1 is stored in a corresponding HARQ process or data corresponding to a MAC PDU formed by the terminal for the uplink resource 1 is stored in a buffer of a corresponding HARQ process, and a HARQ process associated with the uplink resource 1 is different from a HARQ process associated with the uplink resource 2, the terminal may trigger generation of the MAC CE by using which indication information is carried, where the indication information is used to indicate that the MAC PDU is formed for the uplink resource 1 or that the data is stored in the corresponding buffer for the uplink resource 1. Further, the terminal may send, to the network device, the MAC CE that carries the indication information and that is included in a MAC PDU generated for the uplink resource 2. In another possible implementation, in a process of processing the uplink resource 2, if the MAC entity of the terminal determines that the priority of the uplink resource 2 is higher than the priority of the uplink resource 1, a MAC PDU is formed by the terminal for the uplink resource 1, and a HARQ process associated with the uplink resource 1 is the same as a HARQ process associated with the uplink resource 2, the MAC entity of the terminal may reestablish some/all MAC CEs (for example, BSR MAC CEs) in the MAC PDU corresponding to the uplink resource 1 into a MAC PDU generated for the uplink resource 2. In this way, the terminal may send the MAC CE in the MAC PDU corresponding to the uplink resource 1 to the network device by using the MAC PDU corresponding to the uplink resource 2. The terminal does not need to send indication information to the network device, and the network device does not need to schedule retransmission of the uplink resource 1, thereby saving signaling overheads.

In FIG. 8b, an example in which a MAC entity of the terminal performs the method provided in this application is used for description. In a process of processing the uplink resource 2, if the MAC entity of the terminal determines that the priority of the uplink resource 2 is higher than the priority of the uplink resource 1, and no MAC PDU is formed by the terminal for the uplink resource 1 or no data corresponding to a MAC PDU formed by the terminal for the uplink resource 1 is stored in a corresponding HARQ process or no data corresponding to a MAC PDU formed by the terminal for the uplink resource 1 is stored in a buffer of a corresponding HARQ process, the terminal may trigger generation of the MAC CE by using which indication information is carried, where the indication information is used to indicate that no MAC PDU is formed for the uplink resource 1 or that no data is stored in the corresponding buffer for the uplink resource 1. Further, the terminal may send, to the network device, the MAC CE that carries the indication information and that is included in a MAC PDU generated for the uplink resource 2.

For content carried in the MAC CE generated for the uplink resource 1 in FIG. 8a and FIG. 8b and a priority configuration of the MAC CE, refer to the description in the explicit indication manner 1. Details are not described herein again.

It should be noted that, for the foregoing scenarios in FIG. 8a and FIG. 8b, if the uplink resource 1 is actively ignored by the MAC entity of the terminal, for example, when processing the uplink resource 1, the MAC entity knows that there is the uplink resource 2 subsequently and data with a higher priority can be transmitted, the MAC entity may actively clear data stored in the buffer of the HARQ process associated with the uplink resource 1.

Figure 9A:
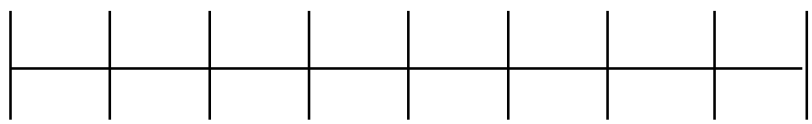
FIG. 9a is a schematic diagram of a MAC subheader of a MAC PDU according to an embodiment of this application.
Figure 9B:
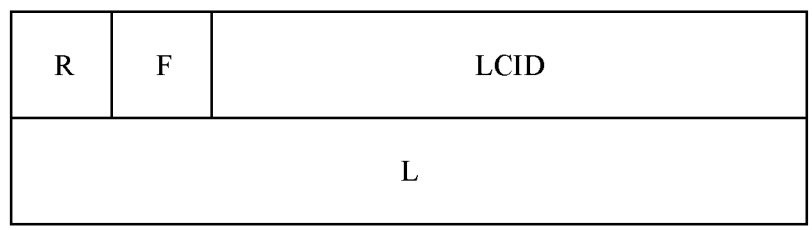
FIG. 9b is a schematic diagram of another MAC subheader of a MAC PDU according to an embodiment of this application.
Figure 9C:
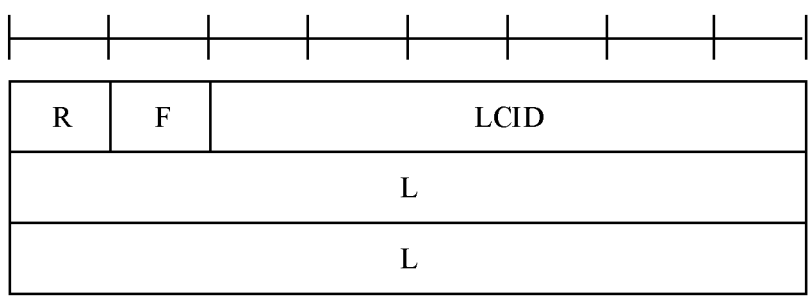
FIG. 9c is a schematic diagram of still another MAC subheader of a MAC PDU according to an embodiment of this application.

In an explicit indication manner 2, a bit of the any MAC subheader in the first MAC PDU is used as the indication information. For example, an R bit (a reserved bit) in the any MAC subheader in the first MAC PDU may be used as the indication information. This may be understood that the R bit in the any MAC subheader in the first MAC PDU is set to an indication bit used to indicate whether the MAC PDU is formed for the second uplink resource or whether the data is stored in the corresponding buffer for the second uplink resource. For example, an R bit in a first MAC subheader included in the first MAC PDU may be set as the indication bit. FIG. 9a is a schematic diagram of a possible first MAC subheader. In this application, a value of an R bit in FIG. 9a being 0 or 1 may be used to indicate whether the MAC PDU is formed for the second uplink resource or whether the data is stored in the corresponding buffer for the second uplink resource. FIG. 9b is a schematic diagram of another possible first MAC subheader. In this application, a value of an R bit in FIG. 9b being 0 or 1 may be used to indicate whether the MAC PDU is formed for the second uplink resource or whether the data is stored in the corresponding buffer for the second uplink resource. FIG. 9c is a schematic diagram of still another possible first MAC subheader. In this application, a value of a first R bit or a second R bit in FIG. 9c being 0 or 1 may be used to indicate whether the MAC PDU is formed for the second uplink resource or whether the data is stored in the corresponding buffer for the second uplink resource. For example, when the value of the R bit is 1, it may indicate that the MAC PDU is formed for the second uplink resource or that the data is stored in the corresponding buffer for the second uplink resource. When the value of the R bit is 0, it may indicate that no MAC PDU is formed for the second uplink resource or that no data is stored in the corresponding buffer for the second uplink resource. For another example, when the value of the R bit is 0, it may indicate that the MAC PDU is formed for the second uplink resource or that the data is stored in the corresponding buffer for the second uplink resource. When the value of the R bit is 1, it may indicate that no MAC PDU is formed for the second uplink resource or that no data is stored in the corresponding buffer for the second uplink resource.

According to an indication method in the explicit indication manner 2, the network device may determine, by using the indication bit included in the MAC subheader in the first MAC PDU sent by the terminal, whether the terminal forms the MAC PDU for the second uplink resource or whether the terminal stores the data in the corresponding buffer for the second uplink resource, to properly schedule the retransmission of the second uplink resource.

The following describes the foregoing explicit indication manner 2 by using an example. FIG. 10a and FIG. 10b are schematic diagrams of an indication manner according to an embodiment of this application. FIG. 10a and FIG. 10b show an example in which two uplink resources that have an overlapping part in time domain are configured for the terminal. The two uplink resources that have the overlapping part in time domain are respectively an uplink resource 1 and an uplink resource 2. Both the uplink resource 1 and the uplink resource 2 may be CG resources or DG resources. It is assumed that a priority of the uplink resource 2 is higher than a priority of the uplink resource 1, the uplink resource 1 is used for new transmission or retransmission, and the uplink resource 2 is used for new transmission. In FIG. 10a and FIG. 10b, an example in which a start moment of the uplink resource 2 is later than a start moment of the uplink resource 1 is used for illustration. Actually, the start moment of the uplink resource 2 may alternatively be the same as or earlier than the start moment of the uplink resource 1. The following separately describes the two scenarios shown in FIG. 10a and FIG. 10b.

In FIG. 10a, an example in which a MAC entity of the terminal performs the method provided in this application is used for description. In a process of processing the uplink resource 2, if the MAC entity of the terminal determines that the priority of the uplink resource 2 is higher than the priority of the uplink resource 1, a MAC PDU is formed by the terminal for the uplink resource 1 or data corresponding to a MAC PDU formed by the terminal for the uplink resource 1 is stored in a corresponding HARQ process or data corresponding to a MAC PDU formed by the terminal for the uplink resource 1 is stored in a buffer of a corresponding HARQ process, and a HARQ process associated with the uplink resource 1 is different from a HARQ process associated with the uplink resource 2, the terminal may set an R bit in any MAC subheader included in a MAC PDU generated for the uplink resource 2 to 1 or 0, to indicate that the MAC PDU is formed for the uplink resource 1 or that the data is stored in the corresponding buffer for the uplink resource 1. After receiving the MAC PDU that is generated for the uplink resource 2 and that is sent by the terminal, the network device may decide to schedule retransmission of the uplink resource 1 based on a value of the R bit included in the MAC subheader in the MAC PDU.

In FIG. 10b, an example in which a MAC entity of the terminal performs the method provided in this application is used for description. In a process of processing the uplink resource 2, if the MAC entity of the terminal determines that the priority of the uplink resource 2 is higher than the priority of the uplink resource 1, and no MAC PDU is formed by the terminal for the uplink resource 1 or no data corresponding to a MAC PDU formed by the terminal for the uplink resource 1 is stored in a corresponding HARQ process or no data corresponding to a MAC PDU formed by the terminal for the uplink resource 1 is stored in a buffer of a corresponding HARQ process, the terminal may set an R bit in any MAC subheader included in a MAC PDU generated for the uplink resource 2 to 0 or 1, to indicate that no MAC PDU is formed for the uplink resource 1 or that no data is stored in the corresponding buffer for the uplink resource 1. After receiving the MAC PDU that is generated for the uplink resource 2 and that is sent by the terminal, the network device may decide not to schedule retransmission of the uplink resource 1 based on a value of the R bit included in the MAC subheader in the MAC PDU.

In an explicit indication manner 3, the indication information is carried in the uplink control information (UCI).

Based on the foregoing explicit indication manner 3, in a possible implementation, when forming the MAC PDU for the second uplink resource or storing the data in the corresponding buffer for the second uplink resource, the terminal sends the UCI to the network device. When the terminal forms no MAC PDU for the second uplink resource or stores no data in the corresponding buffer for the second uplink resource, the terminal does not send the UCI to the network device. The network device may determine, based on whether the terminal sends the UCI, whether the terminal forms the MAC PDU for the second uplink resource or whether the terminal stores the data in the corresponding buffer for the second uplink resource, to properly schedule the retransmission of the second uplink resource.

Based on the foregoing explicit indication manner 3, in a possible implementation, when the terminal forms the MAC PDU for the second uplink resource or stores the data in the corresponding buffer for the second uplink resource or when the terminal forms no MAC PDU for the second uplink resource or stores no data in the corresponding buffer for the second uplink resource, the terminal sends the UCI to the network device, and carries, in the UCI, an indication bit used to indicate whether the MAC PDU is formed for the second uplink resource or whether the data is stored in the corresponding buffer for the second uplink resource. A value of the indication bit indicates whether the MAC PDU is formed for the second uplink resource or whether the data is stored in the corresponding buffer for the second uplink resource. For example, the indication bit is one bit. When the value of the bit is 1, it may indicate that the MAC PDU is formed for the second uplink resource or that the data is stored in the corresponding buffer for the second uplink resource. When the value of the bit is 0, it may indicate that no MAC PDU is formed for the second uplink resource or that no data is stored in the corresponding buffer for the second uplink resource. Based on this implementation, the network device may determine, based on a value/status of the indication bit in the UCI, whether the terminal forms the MAC PDU for the second uplink resource or whether the terminal stores the data in the corresponding buffer for the second uplink resource, to properly schedule the retransmission of the second uplink resource.

Based on the foregoing explicit indication manner 3, in addition to including the indication bit, the UCI may include one or more pieces of the following information:

Item 1: Identification information of the HARQ process associated with the second uplink resource Item 2: Location information of the second uplink resource For example, the location information may include a time point of a start moment of the second uplink resource, for example, an SFN, a slot, and/or a symbol value.

Item 3: Identifier or priority of an LCH with a highest priority in the second MAC PDU.

Item 4: SR information associated with the LCH with the highest priority in the second MAC PDU. For example, the SR information may include information such as an SR configuration ID.

It should be noted that for detailed content of Item 1 to Item 4, refer to related descriptions in the explicit indication manner 1. Details are not described herein again.

Based on the foregoing explicit indication manner 3, the terminal may send the UCI to the network device in the following two manners:

Manner 1: The MAC entity of the terminal indicates the PHY entity to send the UCI to the network device.

Manner 2: The PHY entity of the terminal sends the UCI to the network device.

Based on the foregoing explicit indication manner 3, in a possible implementation, a UCI parameter, for example, a parameter such as a time-frequency resource location or a format for sending the UCI, may be associated with the first uplink resource or the second uplink resource. For example, the UCI parameter is the time-frequency resource location for sending the UCI. When the first uplink resource or the second uplink resource is a CG resource, the time-frequency resource location of the UCI may be configured by using the RRC signaling. When the first uplink resource or the second uplink resource is a DG resource, the time-frequency resource location of the UCI may be configured by using the RRC signaling and/or indicated by using DCI. For example, when the first uplink resource is a DG resource, the time-frequency resource location of the UCI may be indicated in DCI for allocating the first uplink resource. Alternatively, when the first uplink resource is a DG resource, a time-frequency resource location set may be configured by using the RRC signaling, and a time-frequency resource location that is in the time-frequency resource location set and that is indicated in DCI for allocating the first uplink resource is used as the time-frequency resource location of the UCI. For another example, when the second uplink resource is a DG resource, the time-frequency resource location of the UCI may be indicated in DCI for allocating the second uplink resource. Alternatively, when the second uplink resource is a DG resource, a time-frequency resource location set may be configured by using the RRC signaling, and a time-frequency resource location that is in the time-frequency resource location set and that is indicated in DCI for allocating the second uplink resource is used as the time-frequency resource location of the UCI. Based on this implementation, the network device may determine, based on whether UCI signaling is received at a location related to the uplink resource or a value/status of an indication bit in received UCI signaling, whether the terminal forms the MAC PDU for the second uplink resource or whether the terminal stores the data in the corresponding buffer for the second uplink resource, to properly schedule the retransmission of the second uplink resource. For example, an example in which the UCI parameter is associated with the first uplink resource is used for description. When the terminal forms the MAC PDU for the second uplink resource or stores the data in the corresponding buffer for the second uplink resource, the terminal determines a corresponding UCI parameter based on the first uplink resource. If the first uplink resource is a CG resource, parameters such as the time-frequency resource location of the UCI are determined by using RRC signaling for configuring the CG, and the UCI is sent to the network device on a corresponding resource. If the first uplink resource is a DG resource, parameters such as the time-frequency resource location of the UCI are indicated by the DCI for allocating the first uplink resource, the time-frequency resource location for sending the UCI and the like are determined based on indication information in the DCI. For another example, an example in which the UCI parameter is associated with the second uplink resource is used for description. When the terminal forms the MAC PDU for the second uplink resource or stores the data in the corresponding buffer for the second uplink resource, the terminal determines a corresponding UCI parameter based on the second uplink resource. If the second uplink resource is a CG resource, parameters such as the time-frequency resource location of the UCI are determined by using RRC signaling for configuring the CG, and the UCI is sent to the network device on a corresponding resource. If the second uplink resource is a DG resource, parameters such as the time-frequency resource location of the UCI are indicated by DCI for allocating the second uplink resource, the time-frequency resource location for sending the UCI and the like are determined based on indication information in the DCI. In this embodiment, a time domain/frequency domain resource location for sending the UCI may be calculated by the terminal based on a time domain/frequency domain resource location of the first uplink resource or the second uplink resource and in a specific manner. For example, there may be a fixed time interval between a time domain location for sending the UCI and a time domain location of the first uplink resource. Alternatively, there may be a fixed time interval between a time domain location for sending the UCI and a time domain location of the second uplink resource. There may be a fixed function relationship between the frequency domain location for sending the UCI and the frequency domain location of the first uplink resource. Alternatively, there may be a fixed function relationship between the frequency domain location for sending the UCI and the frequency domain location of the second uplink resource.

Figure 11:
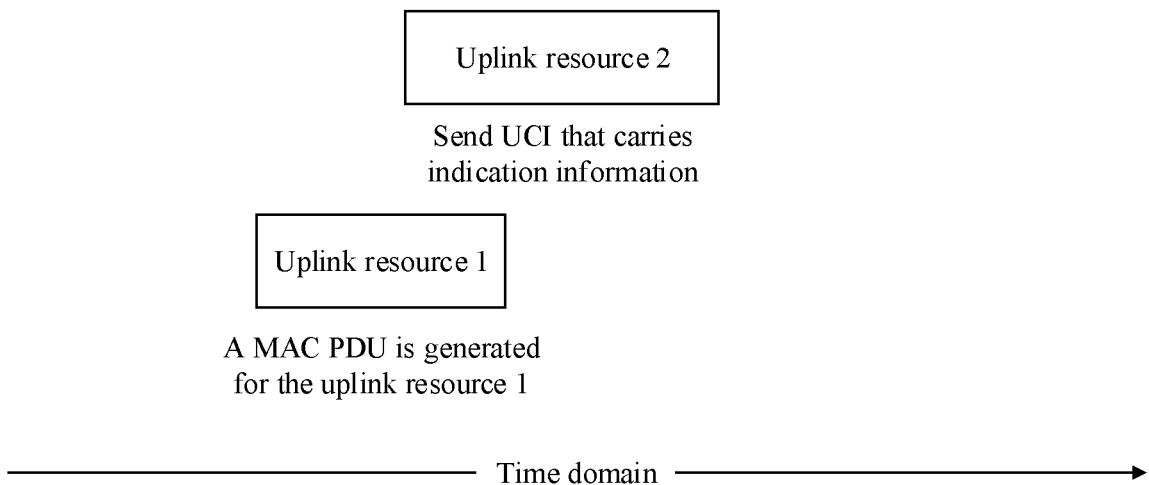
FIG. 11 is a schematic diagram of still another indication manner according to an embodiment of this application.

The following describes the foregoing explicit indication manner 3 by using an example. FIG. 11 is a schematic diagram of an indication manner according to an embodiment of this application. FIG. 11 shows an example in which two uplink resources that have an overlapping part in time domain are configured for the terminal. The two uplink resources that have the overlapping part in time domain are respectively an uplink resource 1 and an uplink resource 2. Both the uplink resource 1 and the uplink resource 2 may be CG resources or DG resources. It is assumed that a priority of the uplink resource 2 is higher than a priority of the uplink resource 1, the uplink resource 1 is used for new transmission or retransmission, and the uplink resource 2 is used for new transmission or retransmission. In FIG. 11, an example in which a start moment of the uplink resource 2 is later than a start moment of the uplink resource 1 is used for illustration. Actually, the start moment of the uplink resource 2 may alternatively be the same as or earlier than the start moment of the uplink resource 1. The following describes the scenario shown in FIG. 11.

In FIG. 11, an example in which a MAC entity of the terminal performs the method provided in this application is used for description. In a process of processing the uplink resource 2, if the MAC entity of the terminal determines that the priority of the uplink resource 2 is higher than the priority of the uplink resource 1, a MAC PDU is formed by the terminal for the uplink resource 1 or data corresponding to a MAC PDU formed by the terminal for the uplink resource 1 is stored in a corresponding HARQ process or data corresponding to a MAC PDU formed by the terminal for the uplink resource 1 is stored in a buffer of a corresponding HARQ process, and a HARQ process associated with the uplink resource 1 is different from a HARQ process associated with the uplink resource 2, the terminal may send UCI that carries indication information to the network device. In addition, when the terminal forms no MAC PDU for the uplink resource 1 or stores no data in the corresponding buffer for the uplink resource 1, the terminal does not send the UCI to the network device. In this case, the network device may determine, based on whether the terminal sends the UCI, whether the terminal forms the MAC PDU for the uplink resource 1 or whether the terminal stores the data in the corresponding buffer for the uplink resource 1, to properly schedule retransmission of the uplink resource 1. Herein, the MAC entity may indicate the PHY entity to send the UCI.

It should be noted that, in addition to a scenario in which uplink resources of a same terminal overlap, the foregoing explicit indication manner 3 may further be used for an uplink resource preemption scenario between different terminals. The following describes in detail a problem existing in the uplink resource preemption scenario between the terminals, and how to resolve the problem by using the foregoing explicit indication manner 3 provided in this embodiment of this application.

Uplink resource preemption between two terminals is used as an example. It is assumed that the network device configures an uplink resource 1 for a terminal 1, and the uplink resource may be a CG resource or a DG resource. In this case, if the network device detects that a terminal 2 has more urgent or higher-priority uplink data to be transmitted, the network device may indicate, by using indication signaling, the terminal 1 not to perform uplink transmission on the uplink resource 1, and indicate the terminal 2 to perform uplink transmission by using the uplink resource 1. In this case, it may be understood that the uplink resource 1 of the terminal 1 is preempted by the terminal 2. In this process, the terminal 1 processes the uplink resource 1 in the following three cases:

In a first case, the terminal 1 has no proper to-be-transmitted data for the uplink resource 1, and the terminal 1 prepares to skip the uplink resource 1.

In a second case, before processing the uplink resource 1, the terminal 1 receives the indication signaling sent by the network device, to indicate the terminal 1 not to perform uplink transmission on the uplink resource 1. In this case, a MAC entity of the terminal 1 may ignore the uplink resource 1.

In a third case, the terminal 1 forms a MAC PDU for the uplink resource 1, and delivers the MAC PDU to a PHY entity. After receiving the indication signaling sent by the network device, the PHY entity gives up transmitting the uplink resource 1.

For the foregoing three cases, the network device cannot receive a signal on the uplink resource 1. Currently, for the foregoing scenario, in a processing manner, the network device considers by default that the terminal 1 enables a skip mechanism. When the network device cannot receive the signal on the uplink resource 1, it is considered that the terminal 1 has no proper signal to be transmitted on the uplink resource 1. Therefore, the terminal 1 does not schedule retransmission of the uplink resource 1. However, actually, the terminal 1 may not skip the uplink resource 1, but forms a data packet for the uplink resource 1. Because the uplink resource 1 is preempted by the terminal 2, the terminal 1 cannot send the data packet formed for the uplink resource 1. In this case, if the network device does not schedule the retransmission of the uplink resource 1, a data loss may occur, and user experience is further affected. In another processing manner, for the foregoing scenario, the network device is configured to schedule retransmission of the uplink resource 1. However, actually, the terminal 1 may skip the uplink resource 1 or ignore the uplink resource 1. In other words, the terminal may not form the MAC PDU for the uplink resource 1, or may not store data in a corresponding buffer for the uplink resource 1. In this case, if the network device schedules the retransmission of the uplink resource 1, signaling overheads are increased, and retransmission resources are wasted.

A method in the foregoing explicit indication manner 3 in this application may be used to resolve the foregoing existing problem.

Based on the foregoing explicit indication manner 3, the terminal 1 may send the UCI to the network device, to indicate whether the MAC PDU is formed for the uplink resource 1 or whether the data is stored in the corresponding buffer for the uplink resource 1. In a possible implementation, when receiving preemption indication signaling from the network device, and forming the MAC PDU for the uplink resource 1 or storing the data in the corresponding buffer for the uplink resource 1, the terminal 1 sends the UCI to the network device. In this application, the preemption indication signaling is used to indicate that the terminal 1 does not perform uplink transmission on the uplink resource 1. It may be understood that the preemption indication signaling is used to indicate that the uplink resource 1 is preempted. When the terminal 1 receives the preemption indication signaling from the network device, and when the terminal 1 forms no MAC PDU for the uplink resource 1 or stores no data in the corresponding buffer for the uplink resource 1, the terminal 1 does not send the UCI to the network device. The network device may determine, based on whether the terminal 1 sends the UCI, whether the terminal 1 forms the MAC PDU for the uplink resource 1 or whether the terminal 1 stores the data in the corresponding buffer for the uplink resource 1, to properly schedule the retransmission of the uplink resource 1. In another possible implementation, when the terminal 1 forms the MAC PDU for the uplink resource 1 or stores the data in the corresponding buffer for the uplink resource 1 or when the terminal 1 forms no MAC PDU for the uplink resource 1 or stores no data in the corresponding buffer for the uplink resource 1, the terminal 1 sends the UCI to the network device, and carries, in the UCI, an indication bit used to indicate whether the MAC PDU is formed for the uplink resource 1 or whether the data is stored in the corresponding buffer for the uplink resource 1. A value of the indication bit indicates whether the MAC PDU is formed for the uplink resource 1 or whether the data is stored in the corresponding buffer for the uplink resource 1. For example, the indication bit is one bit. When the value of the bit is 1, it may indicate that the MAC PDU is formed for the uplink resource 1 or that the data is stored in the corresponding buffer for the uplink resource 1. When the value of the bit is 0, it may indicate that no MAC PDU is formed for the uplink resource 1 or that no data is stored in the corresponding buffer for the uplink resource 1. Based on this implementation, the network device may determine, based on a value/status of the indication bit in the UCI, whether the terminal 1 forms the MAC PDU for the uplink resource 1 or whether the terminal 1 stores the data in the corresponding buffer for the uplink resource 1, to properly schedule the retransmission of the uplink resource 1.

That the data is stored in the corresponding buffer for the uplink resource 1 may be understood as that data corresponding to the MAC PDU formed for the uplink resource 1 is stored in the corresponding HARQ process or data corresponding to the MAC PDU formed for the uplink resource 1 is stored in the buffer of the corresponding HARQ process.

Based on the foregoing example, the terminal 1 may send the UCI to the network device in the following two manners:

Manner 1: A PHY entity of the terminal 1 notifies the MAC entity of the terminal 1 of the preemption indication signaling sent by the network device, and the MAC entity of the terminal 1 indicates the PHY entity to send the UCI to the network device.

Manner 2: After receiving the preemption indication signaling sent by the network device, a PHY entity of the terminal 1 sends the UCI to the network device.

In a possible implementation, a UCI parameter, for example, a parameter such as a time-frequency resource location or a format for sending the UCI, may be associated with the uplink resource 1. For example, the UCI parameter is the time-frequency resource location for sending the UCI. When the uplink resource 1 is a CG resource, the time-frequency resource location of the UCI may be configured by using the RRC signaling. When the uplink resource 1 is a DG resource, the time-frequency resource location of the UCI may be configured by using the RRC signaling and/or indicated by using the DCI. The time-frequency resource location of the UCI may be indicated by using DCI for allocating the uplink resource 1, or the time-frequency resource location of the UCI may be indicated in the preemption indication signaling sent by the network device. Alternatively, when the uplink resource 1 is a DG resource, a set of optional time-frequency resource locations of the UCI may be configured by using the RRC signaling, and a specific time-frequency resource location is indicated from the set of optional time-frequency resource locations of the UCI by using the DCI for allocating the uplink resource 1 or by using the preemption indication signaling sent by the network device. Optionally, in this embodiment, the time domain/frequency domain resource location for sending the UCI may be calculated by the terminal based on a time domain/frequency domain location of the first uplink resource and in a specific manner. For example, there may be a fixed time interval between the time domain location for sending the UCI and the time domain location of the first uplink resource. There may be a fixed function relationship between the frequency domain location for sending the UCI and the frequency domain location of the first uplink resource. Alternatively, there may be a fixed function relationship between the frequency domain location for sending the UCI and the frequency domain location of the second uplink resource.

In the foregoing example, if the uplink resource 1 is preempted by the terminal 2, data may not be sent on a preempted part of resources, or data is sent at reduced power. In this scenario, if the uplink resource 1 is actively ignored by the MAC entity, for example, before processing the uplink resource 1, the MAC entity receives, from the PHY entity, an indication that the uplink resource 1 is preempted by the terminal 2, the MAC entity may clear data in the HARQ process associated with the uplink resource 1.

Second type: The terminal indicates, to the network device in the implicit indication manner, whether the MAC PDU is formed for the second uplink resource or whether the data is stored in the corresponding buffer for the second uplink resource.

In the implicit indication manner, the terminal may indicate, to the network device by using information transmitted on the first uplink resource, whether the MAC PDU is formed for the second uplink resource or whether the data is stored in the corresponding buffer for the second uplink resource. Alternatively, the terminal may indicate, to the network device in a transmission mode of the first MAC PDU, whether the MAC PDU is formed for the second uplink resource or whether the data is stored in the corresponding buffer for the second uplink resource.

Based on the foregoing implicit indication manner, the information transmitted on the first uplink resource may include, for example, a demodulation reference signal (DMRS). In other words, whether the MAC PDU is formed for the second uplink resource or whether the data is stored in the corresponding buffer for the second uplink resource may be indicated by using the DMRS transmitted on the first uplink resource. For example, the network device may configure two types of DMRSs for the terminal by using the RRC signaling, or predefine two types of DMRSs for the terminal. For example, the two types of DMRSs are respectively a DMRS type 1 and a DMRS type 2, and each type of DMRS may include at least one DMRS. When the terminal transmits, on the first uplink resource, a DMRS included in the DMRS type 1, it indicates that the MAC PDU is formed for the second uplink resource or that the data is stored in the corresponding buffer for the second uplink resource. When the terminal transmits, on the first uplink resource, a DMRS included in the DMRS type 2, it indicates that no MAC PDU is formed for the second uplink resource or no data is stored in the corresponding buffer for the second uplink resource.

Based on the foregoing implicit indication manner, the transmission mode of the first MAC PDU may include, for example, a modulation scheme or a scrambling scheme used for transmitting the first MAC PDU. In other words, whether the MAC PDU is formed for the second uplink resource or whether the data is stored in the corresponding buffer for the second uplink resource may be indicated by using the modulation scheme or the scrambling scheme of the first MAC PDU. For example, the network device may configure two types of radio network temporary identifiers (RNTI) for the terminal by using the RRC signaling, or predefine two types of RNTIs for the terminal. For example, the two types of RNTIs are respectively an RNTI type 1 and an RNTI type 2, and each type of RNTI may include at least one RNTI. When the terminal scrambles the first uplink resource by using an RNTI included in the RNTI type 1, it indicates that the MAC PDU is formed for the second uplink resource or that the data is stored in the corresponding buffer for the second uplink resource. When the terminal scrambles the first uplink resource by using an RNTI included in the RNTI type 2, it indicates that no MAC PDU is formed for the second uplink resource or that no data is stored in the corresponding buffer for the second uplink resource. For example, the network device may configure two types of modulation and coding schemes (MCS) for the terminal by using the RRC signaling, or predefine two types of MCSs for the terminal. For example, the two types of MCSs are an MCS type 1 and an MCS type 2, and each type of MCS may include at least one MCS. When the terminal modulates the first uplink resource by using an MCS included in the MCS type 1, it indicates that the MAC PDU is formed for the second uplink resource or that the data is stored in the corresponding buffer for the second uplink resource. When the terminal modulates the first uplink resource by using an MCS included in the MCS type 2, it indicates that no MAC PDU is formed for the second uplink resource or that no data is stored in the corresponding buffer for the second uplink resource.

Figure 12:
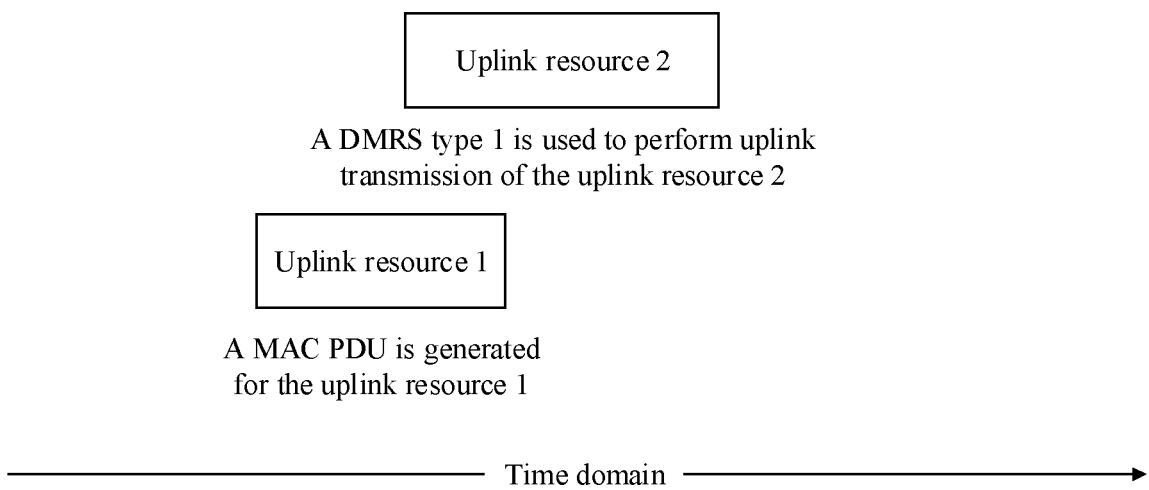
FIG. 12 is a schematic diagram of still another indication manner according to an embodiment of this application.

The following describes the foregoing implicit indication manner by using an example. FIG. 12 is a schematic diagram of an indication manner according to an embodiment of this application. FIG. 12 shows an example in which two uplink resources that have an overlapping part in time domain are configured for the terminal. The two uplink resources that have the overlapping part in time domain are respectively an uplink resource 1 and an uplink resource 2. Both the uplink resource 1 and the uplink resource 2 may be CG resources or DG resources. It is assumed that a priority of the uplink resource 2 is higher than a priority of the uplink resource 1, the uplink resource 1 is used for new transmission or retransmission, and the uplink resource 2 is used for new transmission or retransmission. In FIG. 12, an example in which a start moment of the uplink resource 2 is later than a start moment of the uplink resource 1 is used for illustration. Actually, the start moment of the uplink resource 2 may alternatively be the same as or earlier than the start moment of the uplink resource 1. The implicit indication manner is described below with reference to the scenario shown in FIG. 12.

In FIG. 12, an example in which a MAC entity of the terminal performs the method provided in this application is used for description. In a process of processing the uplink resource 2, if the MAC entity of the terminal determines that the priority of the uplink resource 2 is higher than the priority of the uplink resource 1, a MAC PDU is formed by the terminal for the uplink resource 1 or data corresponding to a MAC PDU formed by the terminal for the uplink resource 1 is stored in a corresponding HARQ process or data corresponding to a MAC PDU formed by the terminal for the uplink resource 1 is stored in a buffer of a corresponding HARQ process, and a HARQ process associated with the uplink resource 1 is different from a HARQ process associated with the uplink resource 2, the MAC entity of the terminal indicates the PHY entity to perform uplink transmission on the uplink resource 2 by using the DMRS type 1. In another case, the terminal performs uplink transmission on the uplink resource 2 by using the DMRS type 2. Based on this implementation, the network device may determine, based on a DMRS type transmitted on the uplink resource 2, whether the terminal forms the MAC PDU for the uplink resource 1 or whether the terminal stores the data in the corresponding buffer for the uplink resource 1, to properly schedule retransmission of the uplink resource 1.

Optionally, the PHY entity of the terminal may perform the method. When determining that the priority of the uplink resource 2 is higher than the priority of the uplink resource 1, the PHY entity of the terminal performs uplink transmission on the uplink resource 1 by using the DMRS type 1.

Because the retransmission of the uplink resource cannot be properly scheduled in the scenario in which the uplink resources overlap in time domain, an embodiment of this application provides another communication method. In this method, for a scenario in which uplink resources overlap in time domain, when determining to send a signal on an overlapping part by using an uplink resource with a higher priority, the terminal may transmit, by using a resource that arrives in a next period, a MAC PDU formed for an uplink resource with a lower priority, thereby reducing a data packet loss. In addition, according to the method, the terminal does not need to indicate the network device to schedule a new resource, thereby reducing signaling overheads.

Figure 13:
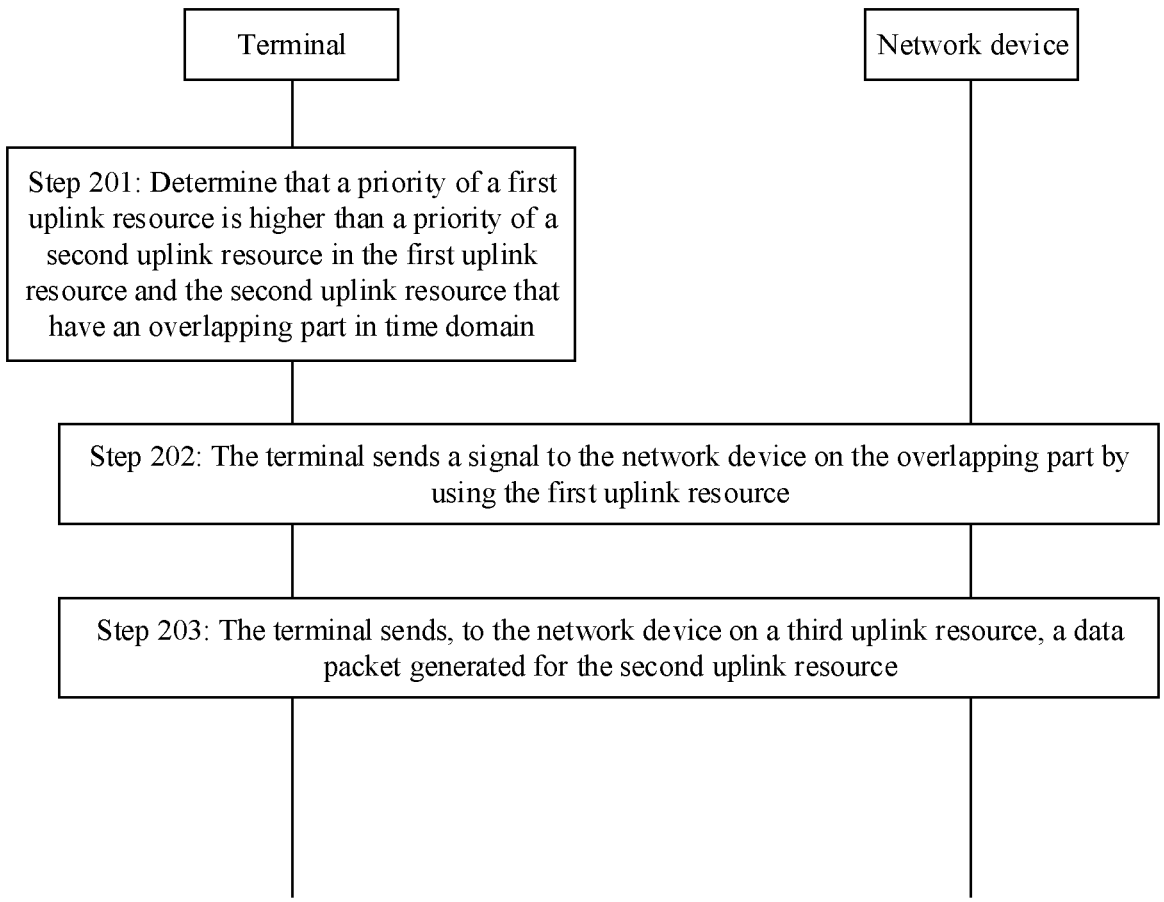
FIG. 13 is an implementation flowchart of another communication method according to an embodiment of this application.

FIG. 13 is an implementation flowchart of another communication method according to an embodiment of this application. Referring to FIG. 13, the method includes the following steps.

Step 201: A terminal determines that a priority of a first uplink resource is higher than a priority of a second uplink resource in the first uplink resource and the second uplink resource that have an overlapping part in time domain.

Step 202: The terminal sends a signal to a network device on the overlapping part by using the first uplink resource.

Step 203: The terminal sends, to the network device on a third uplink resource, a data packet generated for the second uplink resource. Further, the third uplink resource is an uplink resource that arrives after the second uplink resource, the third uplink resource and the second uplink resource are associated with a same HARQ process, and the terminal generates no data packet for the third uplink resource.

In a possible implementation, the third uplink resource and the second uplink resource are configuration grant resources that arrive in different periods.

In a possible implementation, the first uplink resource and the second uplink resource are associated with different HARQ processes.

Figure 14:
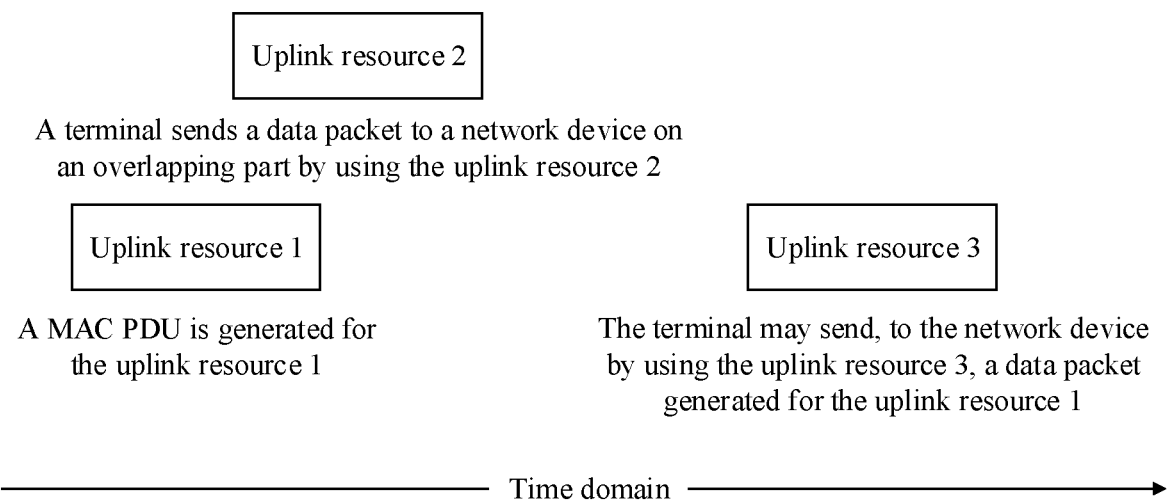
FIG. 14 is a schematic diagram of still another indication manner according to an embodiment of this application.

The following describes the method in FIG. 13 by using an example. FIG. 14 is a schematic diagram of data transmission according to an embodiment of this application. FIG. 14 shows an example in which two uplink resources that have an overlapping part in time domain are configured for the terminal. The two uplink resources that have the overlapping part in time domain are respectively an uplink resource 1 and an uplink resource 2. The uplink resource 2 may be a CG resource or a DG resource, and the uplink resource 1 is a CG resource. It is assumed that a priority of the uplink resource 2 is higher than a priority of the uplink resource 1, the uplink resource 1 is used for new transmission, and the uplink resource 2 is used for new transmission or retransmission. In FIG. 14, an example in which a start moment of the uplink resource 2 is later than a start moment of the uplink resource 1 is used for illustration. Actually, the start moment of the uplink resource 2 may alternatively be the same as or earlier than the start moment of the uplink resource 1. The following describes the scenario shown in FIG. 14.

In FIG. 14, in a process of processing the uplink resource 2, if the terminal determines that the priority of the uplink resource 2 is higher than the priority of the uplink resource 1, a MAC PDU formed by the terminal for the uplink resource 1 or data corresponding to a MAC PDU formed by the terminal for the uplink resource 1 is stored in a corresponding HARQ process or data corresponding to a MAC PDU formed by the terminal for the uplink resource 1 is stored in a buffer of a corresponding HARQ process, and a HARQ process associated with the uplink resource 1 is different from a HARQ process associated with the uplink resource 2, the terminal may send a data packet to the network device on the overlapping part by using the uplink resource 2. When a next CG resource (denoted as an uplink resource 3) associated with the same HARQ process as the uplink resource 1 arrives, if the terminal has no proper data to be transmitted for the uplink resource 3, the terminal prepares to skip the uplink resource 3. In this case, the terminal may send, to the network device by using the uplink resource 3, a data packet generated for the uplink resource 1.

The foregoing mainly describes the solutions provided in the embodiments of this application from a perspective of interaction between the terminal and the network device. It may be understood that to implement the foregoing functions, the terminal and the network device include corresponding hardware structures and/or software modules for performing the functions. With reference to the units and algorithm steps described in the embodiments disclosed in this application, the embodiments of this application can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation falls beyond the scope of the technical solutions in the embodiments of this application.

In the embodiments of this application, division into functional units may be performed on the terminal and the network device based on the foregoing method examples. For example, each functional unit may be obtained through division based on a corresponding function, or two or more functions may be integrated into one processing unit. The integrated unit may be implemented in a form of hardware, or may be implemented in a form of a software functional unit.

Based on a same inventive concept, the embodiments of this application further provide an apparatus configured to implement any one of the foregoing methods. For example, an apparatus is provided, including units (or means) configured to implement the steps performed by the terminal in any one of the foregoing methods. For another example, another apparatus is further provided, including units (or means) configured to implement the steps performed by the network device in any one of the foregoing methods.

Figure 15:
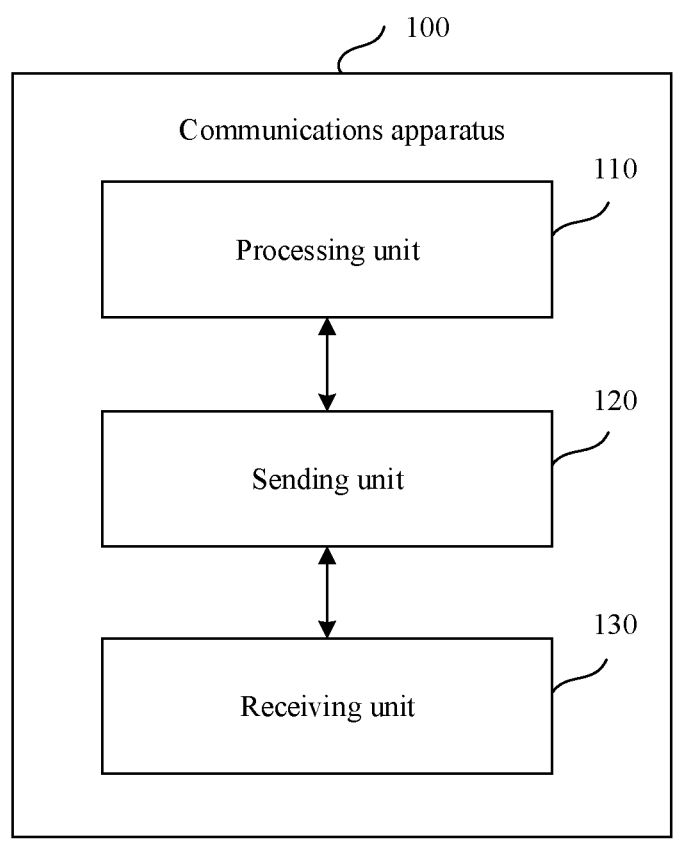
FIG. 15 is a schematic structural diagram of a communications apparatus according to an embodiment of this application.

In a possible implementation, an embodiment of this application provides a communications apparatus 100. The communications apparatus 100 may be applied to a terminal. FIG. 15 is a schematic structural diagram of the communications apparatus 100 according to an embodiment of this application. Referring to FIG. 15, the communications apparatus 100 includes a processing unit 110. During implementation, the communications apparatus 100 may further include a sending unit 120 and a receiving unit 130.

When the communications apparatus 100 is configured to perform the method shown in FIG. 5, the processing unit 110 may be configured to: determine that a priority of a first uplink resource is higher than a priority of a second uplink resource, where the first uplink resource and the second uplink resource have an overlapping part in time domain; and when determining to send a signal on the overlapping part by using the first uplink resource, indicate, to a network device, whether a media access control protocol data unit MAC PDU is formed for the second uplink resource or whether data is stored in a corresponding buffer for the second uplink resource.

When the communications apparatus 100 is configured to perform the method shown in FIG. 13, the processing unit 110 may be configured to determine that a priority of a first uplink resource is higher than a priority of a second uplink resource, where the first uplink resource and the second uplink resource have an overlapping part in time domain. The sending unit 120 may be configured to: send a signal to a network device on the overlapping part by using the first uplink resource, and send a data packet to the network device on a third uplink resource, where the data packet is a data packet generated for the second uplink resource. The third uplink resource is an uplink resource that arrives after the second uplink resource, the third uplink resource and the second uplink resource are associated with a same hybrid automatic repeat request HARQ process, and the terminal generates no data packet for the third uplink resource.

Figure 16:
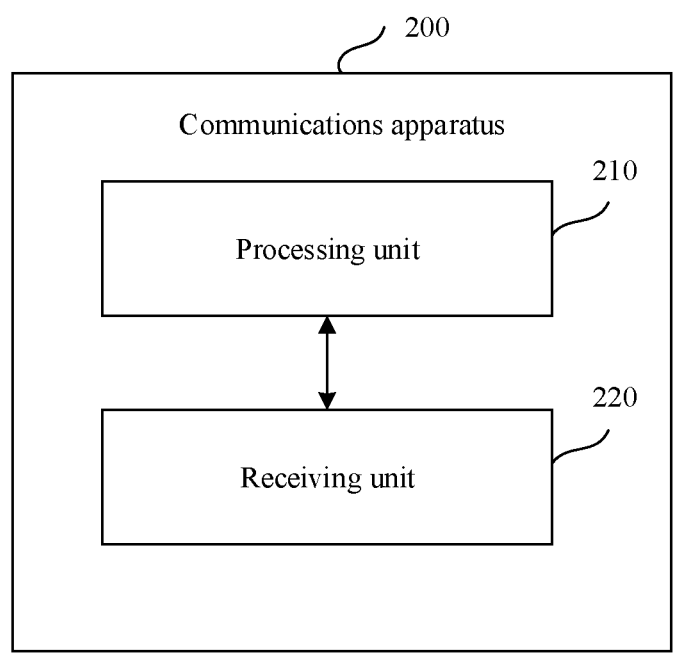
FIG. 16 is a schematic structural diagram of another communications apparatus according to an embodiment of this application.

In a possible implementation, an embodiment of this application further provides a communications apparatus 200. The communications apparatus 200 may be applied to a network device. FIG. 16 is a schematic structural diagram of a communications apparatus 200 according to an embodiment of this application. Referring to FIG. 16, the communications apparatus 200 includes a processing unit 210. During implementation, the communications apparatus 200 may further include a receiving unit 220.

When the communications apparatus 200 is configured to perform the method shown in FIG. 5, the processing unit 210 may be configured to: determine, according to an indication of a terminal, whether a media access control protocol data unit MAC PDU is formed for a second uplink resource or whether data is stored in a corresponding buffer for a second uplink resource; schedule retransmission of the second uplink resource when it is determined that the MAC PDU is formed for the second uplink resource or the data is stored in the corresponding buffer for the second uplink resource; or skip scheduling retransmission of the second uplink resource when it is determined that no MAC PDU is formed for the second uplink resource or that no data is stored in the corresponding buffer for the second uplink resource.

When the communications apparatus 200 is configured to perform the method shown in FIG. 13, the receiving unit 130 may be configured to: receive a signal sent by a terminal by using a first uplink resource, where the first uplink resource and a second uplink resource have an overlapping part in time domain, and a priority of the first uplink resource is higher than a priority of the second uplink resource; receive a data packet sent by the terminal on a third uplink resource, where the data packet is a data packet generated for the second uplink resource, the third uplink resource is an uplink resource that arrives after the second uplink resource, and the third uplink resource and the second uplink resource are associated with a same hybrid automatic repeat request HARQ process; and generate no data packet for the third uplink resource.

When the communications apparatus 100 is applied to the terminal, the communications apparatus 200 is applied to the network device, and the method shown in FIG. 5 is performed, the following operations may further be performed:

In a possible implementation, the receiving unit 220 is configured to receive indication information from the terminal, where the indication information is used to indicate whether the MAC PDU is formed for the second uplink resource or whether the data is stored in the corresponding buffer for the second uplink resource.

In a possible implementation, the processing unit 110 is further configured to: before determining to send the signal on the overlapping part by using the first uplink resource, form a first MAC PDU for the first uplink resource. The processing unit 110 is specifically configured to determine to send the first MAC PDU on the overlapping part by using the first uplink resource.

In a possible implementation, the sending unit 120 is configured to send indication information to the network device, where the indication information is used to indicate whether the MAC PDU is formed for the second uplink resource or whether the data is stored in the corresponding buffer for the second uplink resource.

In a possible implementation, the indication information is carried in a media access control control element MAC CE, and the MAC CE is carried in the first MAC PDU.

In a possible implementation, the indication information is located in a MAC subheader of the MAC CE.

In a possible implementation, the indication information includes a logical channel identifier LCID.

In a possible implementation, the indication information is located in a payload of the MAC CE.

In a possible implementation, the MAC CE includes one or more pieces of the following information:
  identification information of a hybrid automatic repeat request HARQ process associated with the second uplink resource;
  location information of the second uplink resource;
  an identifier or a priority of a logical channel LCH with a highest priority in a second MAC PDU; or
  SR information associated with an LCH with a highest priority in a second MAC PDU, where the second MAC PDU is a MAC PDU formed for the second uplink resource.

In a possible implementation, the indication information includes a bit of the MAC subheader of the first MAC PDU.

In a possible implementation, the indication information is carried in uplink control information UCI.

In a possible implementation, the UCI includes one or more pieces of the following information:
- identification information of a HARQ process associated with the second uplink resource;
- location information of the second uplink resource;
- an identifier or a priority of a logical channel LCH with a highest priority in a second MAC PDU; or
- SR information associated with an LCH with a highest priority in a second MAC PDU, where the second MAC PDU is a MAC PDU formed for the second uplink resource.

In a possible implementation, information transmitted on the first uplink resource is used to indicate whether the MAC PDU is formed for the second uplink resource or whether the data is stored in the corresponding buffer for the second uplink resource; or a transmission mode of the first MAC PDU is used to indicate whether the MAC PDU is formed for the second uplink resource or whether the data is stored in the corresponding buffer for the second uplink resource.

In a possible implementation, a HARQ process associated with the first uplink resource is different from the HARQ process associated with the second uplink resource.

When the communications apparatus 100 is applied to the terminal, the communications apparatus 200 is applied to the network device, and the method shown in FIG. 13 is performed, the following operations may further be performed:

In a possible implementation, the third uplink resource and the second uplink resource are resources that arrive in different periods and that are in configuration grant resources.

In a possible implementation, the first uplink resource and the second uplink resource are associated with different HARQ processes.

It should be understood that division into the units in the foregoing apparatuses is merely logical function division. In an actual implementation, all or some of the units may be integrated into a physical entity, or may be physically separate. In addition, all the units in the apparatuses may be implemented in a form of software invoked by a processing element, or may be implemented in a form of hardware. Alternatively, some units may be implemented by a processing element invoking software, and some units may be implemented in a form of hardware. For example, each unit may be an independently disposed processing element, or may be integrated into a chip of the apparatus for implementation. Alternatively, each unit may be stored in a memory in a form of a program to be invoked by a processing element of the apparatus to perform a function of the unit. In addition, all or some of the units may be integrated together, or may be implemented independently. The processing element herein may also be referred to as a processor, and may be an integrated circuit having a signal processing capability. In an implementation process, the steps in the foregoing methods or the foregoing units may be implemented by using a hardware integrated logic circuit of the processor element, or may be implemented by the processing element invoking software.

In an example, a unit in any one of the foregoing apparatuses may be one or more integrated circuits configured to implement the foregoing methods, for example, one or more specific-integrated circuits (ASIC), one or more microprocessors (DSP), one or more field programmable gate arrays (FPGA), or a combination of at least two of the integrated circuits. For another example, when a unit in the apparatus is implemented by a processing element scheduling a program, the processing element may be a general-purpose processor, for example, a central processing unit (CPU) or another processor that can invoke the program. For still another example, the units may be integrated and implemented in a form of a system-on-a-chip (SOC).

The foregoing receiving unit is an interface circuit of the apparatus, and is configured to receive a signal from another apparatus. For example, when the apparatus is implemented in a form of a chip, the receiving unit is an interface circuit that is of the chip and that is configured to receive a signal from another chip or apparatus. The foregoing sending unit is an interface circuit of the apparatus, and is configured to send a signal to another apparatus. For example, when the apparatus is implemented in a form of a chip, the sending unit is an interface circuit that is of the chip and that is configured to send a signal to another chip or apparatus.

The terminal exchanges information with the network device by using an interface protocol between the terminal and the network device, for example, sends the indication information or the first MAC PDU. The terminal is wirelessly connected to the network device, and the terminal exchanges information with the network device through a wireless interface, for example, sends the indication information or the first MAC PDU.

Figure 17:
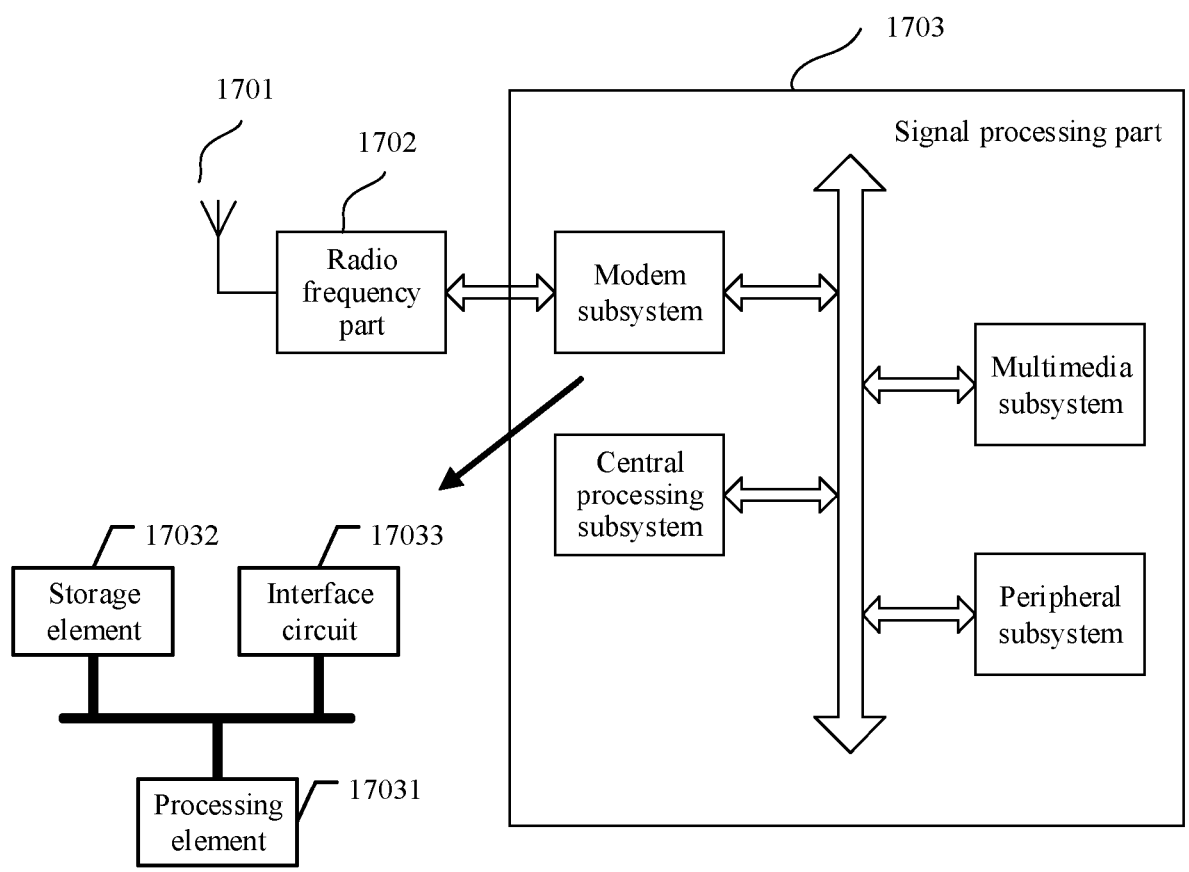
FIG. 17 is a schematic structural diagram of a terminal according to an embodiment of this application.

FIG. 17 is a schematic structural diagram of a terminal according to an embodiment of this application. The terminal may be the terminal in the foregoing embodiments and is configured to implement operations of the terminal in the foregoing embodiments. As shown in FIG. 17, the terminal includes an antenna 1701, a radio frequency part 1702, and a signal processing part 1703. The antenna 1701 is connected to the radio frequency part 1702. In a downlink direction, the radio frequency part 1702 receives, through the antenna 1701, information sent by a network device, and sends, to the signal processing part 1703 for processing, the information sent by the network device. In an uplink direction, the signal processing part 1703 processes information from the terminal, and sends the information to the radio frequency part 1702. The radio frequency part 1702 processes the information from the terminal, and then sends processed information to the network device through the antenna 1701.

The signal processing part 1703 may include a modem subsystem, configured to process data at each communications protocol layer. The signal processing part 1703 may further include a central processing subsystem, configured to implement processing of an operating system and an application layer of the terminal. In addition, the signal processing part 1703 may further include another subsystem, for example, a multimedia subsystem or a peripheral subsystem. The multimedia subsystem is configured to control a camera or screen display of the terminal, and the peripheral subsystem is configured to implement a connection to another device. The modem subsystem may be a separately disposed chip. Optionally, the foregoing apparatus used for the terminal may be located in the modem subsystem.

The modem subsystem may include one or more processing elements 17031, for example, include one main control CPU and another integrated circuit. In addition, the modem subsystem may further include a storage element 17032 and an interface circuit 17033. The storage element 17032 is configured to store data and a program. However, a program used to perform the methods performed by the terminal in the foregoing methods may not be stored in the storage element 17032, but is stored in a memory outside the modem subsystem, and is loaded and used by the modem subsystem when to be used. The interface circuit 17033 is configured to communicate with another subsystem. The foregoing apparatus used for the terminal may be located in the modem subsystem. The modem subsystem may be implemented by using a chip. The chip includes at least one processing element and an interface circuit. The processing element is configured to perform the steps of any method performed by the terminal, and the interface circuit is configured to communicate with another apparatus. In an implementation, units of the terminal that implement the steps in the foregoing methods may be implemented by a processing element scheduling a program. For example, an apparatus applied to the terminal includes a processing element and a storage element. The processing element invokes a program stored in the storage element, to cause the terminal to perform the methods in the foregoing method embodiments. The storage element may be a storage element located on a same chip as the processing element, namely, an on-chip storage element.

In another implementation, the program used to perform the methods performed by the terminal in the foregoing methods may be in a storage element located on a different chip from the processing element, namely, an off-chip storage element. In this case, the processing element invokes or loads the program from the off-chip storage element to the on-chip storage element, to cause the terminal to perform the methods in the foregoing method embodiments.

In still another implementation, units that implement the steps in the foregoing methods and that are in the apparatus applied to the terminal may be configured as one or more processing elements. These processing elements are disposed in the modem subsystem. The processing element herein may be an integrated circuit, for example, one or more ASICs, one or more DSPs, one or more FPGAs, or a combination of these types of integrated circuits. These integrated circuits may be integrated together to form a chip.

The units of the terminal that implement the steps in the foregoing methods may be integrated together, and implemented in a form of a system-on-a-chip (SOC). The SOC chip is configured to implement the foregoing methods. At least one processing element and storage element may be integrated into the chip, and the processing element invokes a program stored in the storage element to implement the foregoing methods performed by the terminal. Alternatively, at least one integrated circuit may be integrated into the chip, to implement the foregoing methods performed by the terminal. Alternatively, with reference to the foregoing implementations, functions of some units may be implemented by the processing element invoking the program, and functions of some units may be implemented by the integrated circuit.

It can be learned that the foregoing apparatus applied to the terminal may include at least one processing element and an interface circuit. The at least one processing element is configured to perform any method performed by the terminal provided in the foregoing method embodiments. The processing element may perform some or all steps performed by the terminal, in a first manner, to be specific, by invoking the program stored in the storage element; or may perform some or all steps performed by the terminal, in a second manner, to be specific, by using a hardware integrated logic circuit in the processor element in combination with an instruction; or may certainly perform, by combining the first manner and the second manner, some or all steps performed by the terminal.

As described above, the processing element herein may be a general-purpose processor, for example, a CPU, or may be one or more integrated circuits configured to implement the foregoing methods, for example, one or more ASICs, one or more microprocessors DSPs, one or more FPGAs, or a combination of at least two of the integrated circuits.

The storage element may be a memory, or may be a general term of a plurality of storage elements.

Figure 18:
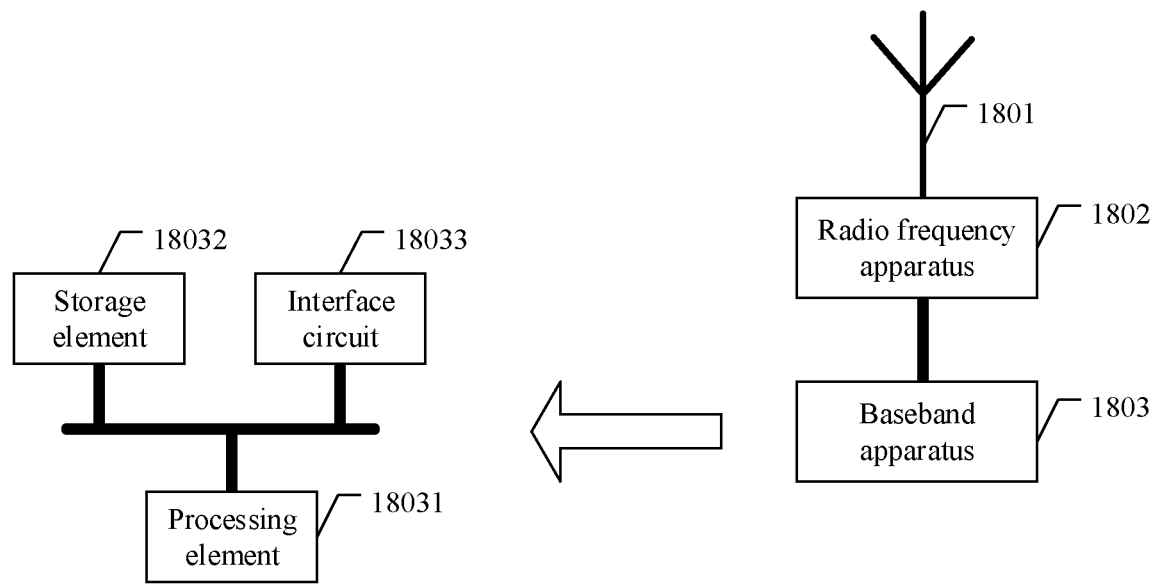
FIG. 18 is a schematic structural diagram of a network device according to an embodiment of this application.

FIG. 18 is a schematic structural diagram of a network device according to an embodiment of this application. The network device is configured to implement operations of the network device in the foregoing embodiments. As shown in FIG. 18, the network device includes an antenna 1801, a radio frequency apparatus 1802, and a baseband apparatus 1803. The antenna 1801 is connected to the radio frequency apparatus 1802. In an uplink direction, the radio frequency apparatus 1802 receives, through the antenna 1801, information sent by a terminal, and sends, to the baseband apparatus 1803 for processing, the information sent by the terminal. In a downlink direction, the baseband apparatus 1803 processes the information from the terminal, and sends the information to the radio frequency apparatus 1802. The radio frequency apparatus 1802 processes the information from the terminal, and then sends processed information to the terminal through the antenna 1801.

The baseband apparatus 1803 may include one or more processing elements 18031, for example, include one main control CPU and another integrated circuit. In addition, the baseband apparatus 1803 may further include a storage element 18032 and an interface circuit 18033. The storage element 18032 is configured to store a program and data. The interface circuit 18033 is configured to exchange information with the radio frequency apparatus 1802, and the interface circuit is, for example, a common public radio interface (CPRI). The foregoing apparatus applied to the network device may be located in the baseband apparatus 1803. For example, the foregoing apparatus applied to the network device may be a chip in the baseband apparatus 1803. The chip includes at least one processing element and an interface circuit. The processing element is configured to perform the steps of any method performed by the network device. The interface circuit is configured to communicate with another apparatus. In an implementation, units of the network device that implement the steps in the foregoing methods may be implemented by a processing element scheduling a program. For example, the apparatus applied to the network device includes a processing element and a storage element. The processing element invokes a program stored in the storage element, to perform the methods performed by the network device in the foregoing method embodiments. The storage element may be a storage element located on a same chip as the processing element, namely, an on-chip storage element, or may be a storage element located on a different chip from the processing element, namely, an off-chip storage element.

In another implementation, units that implement the steps in the foregoing methods and that are in the apparatus applied to the network device may be configured as one or more processing elements. These processing elements are disposed in the baseband apparatus. The processing element herein may be an integrated circuit, for example, one or more ASICs, one or more DSPs, one or more FPGAs, or a combination of these types of integrated circuits. These integrated circuits may be integrated together to form a chip.

The units of the network device that implement the steps in the foregoing methods may be integrated together, and implemented in a form of a system-on-a-chip (SOC). For example, the baseband apparatus includes the SOC chip, configured to implement the foregoing methods. At least one processing element and storage element may be integrated into the chip, and the processing element invokes a program stored in the storage element to implement the foregoing methods performed by the network device. Alternatively, at least one integrated circuit may be integrated into the chip, to implement the foregoing methods performed by the network device. Alternatively, with reference to the foregoing implementations, functions of some units may be implemented by the processing element invoking the program, and functions of some units may be implemented by the integrated circuit.

It can be learned that the foregoing apparatus applied to the network device may include at least one processing element and an interface circuit. The at least one processing element is configured to perform any method performed by the network device provided in the foregoing method embodiments. The processing element may perform some or all steps performed by the network device, in a first manner, to be specific, by invoking the program stored in the storage element; or may perform some or all steps performed by the network device, in a second manner, to be specific, by using a hardware integrated logic circuit in the processor element in combination with an instruction; or may certainly perform, by combining the first manner and the second manner, some or all steps performed by the network device.

As described above, the processing element herein may be a general-purpose processor, for example, a CPU, or may be one or more integrated circuits configured to implement the foregoing methods, for example, one or more ASICs, one or more microprocessors DSPs, one or more FPGAs, or a combination of at least two of the integrated circuits.

The storage element may be a memory, or may be a general term of a plurality of storage elements.

Figure 19:
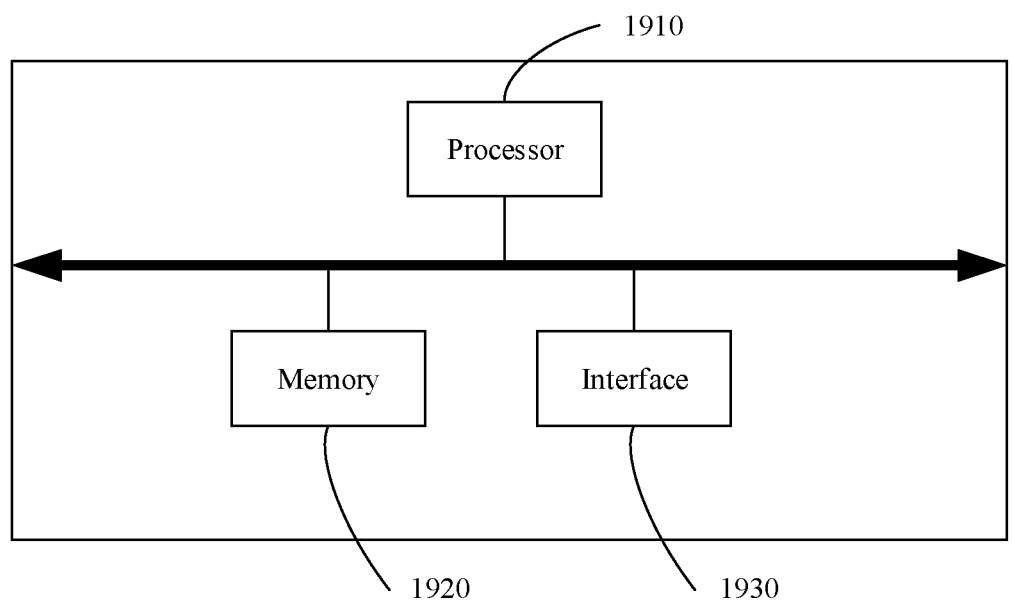
FIG. 19 is a schematic structural diagram of another network device according to an embodiment of this application.

FIG. 19 is a schematic structural diagram of another network device according to an embodiment of this application. The network device may be the network device in the foregoing embodiments and is configured to implement operations of the network device in the foregoing embodiments.

As shown in FIG. 19, the network device includes a processor 1910, a memory 1920, and an interface 1930. The processor 1910, the memory 1920, and the interface 1930 are signal-connected.

A reference time point determining apparatus is located in the network device, and a function of each unit may be implemented by the processor 1910 by invoking a program stored in the memory 1920. That is, the reference time point determining apparatus includes a memory and a processor. The memory is configured to store a program, and the program is invoked by the processor to perform the methods in the foregoing method embodiments. The processor herein may be an integrated circuit having a signal processing capability, for example, a CPU. Alternatively, functions of the foregoing units may be implemented by one or more integrated circuits configured to implement the foregoing methods, for example, one or more ASICs, one or more microprocessors DSPs, one or more FPGAs, or a combination of at least two of the integrated circuits. Alternatively, the foregoing implementations may be combined.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another data processing device to generate a machine, so that the instructions executed by a computer or the processor of the another data processing device generate an apparatus for implementing a specific function in one or more processes in the flowcharts and/or in one or more blocks in the block diagrams.

These computer program instructions may be stored in a computer-readable memory that can indicate the computer or the another data processing device to work in a specific manner, so that the instructions stored in the computer-readable memory generate an artifact that includes an instruction apparatus. The instruction apparatus implements the specific function in one or more processes in the flowcharts and/or in one or more blocks in the block diagrams.

These computer program instructions may be loaded onto the computer or the another programmable data processing device, so that a series of operations and steps are performed on the computer or the another programmable device, thereby generating computer-implemented processing. Therefore, the instructions executed on the computer or the another programmable device provide steps for implementing the specific function in one or more processes in the flowcharts and/or in one or more blocks in the block diagrams.

Obviously, a person skilled in the art can make various modifications and variations to this application without departing from the spirit and scope of this application. This application is intended to cover these modifications and variations of this application provided that they fall within the scope of protection defined by the following claims and their equivalent technologies.

The invention claimed is:

1. A communication method, comprising:
   sending, by a terminal to a network device, a signal on a first uplink resource, wherein the first uplink resource has a higher priority than a second uplink resource and the first uplink resource overlaps with the second uplink resource in a time domain; and
   sending, by the terminal to the network device, a data packet generated for the second uplink resource on a third uplink resource.

2. The method according to claim 1, wherein the third uplink resource is an uplink resource that arrives after the second uplink resource.

3. The method according to claim 1, wherein the third uplink resource and the second uplink resource are associated with a hybrid automatic repeat request (HARQ) process.

4. The method according to claim 1, wherein the third uplink resource and the second uplink resource are configuration grant resources that arrive in different periods.

5. The method according to claim 1, further comprising:
determining, by the terminal, that the priority of the first uplink resource is higher than the priority of the second uplink resource.

6. The method according to claim 5, wherein the determining, by the terminal, that the priority of the first uplink resource is higher than the priority of the second uplink resource comprises:
determining, based on a highest priority of a logical channel (LCH) to which data that can be transmitted on the first uplink resource and the second uplink resource belongs, that the priority of the first uplink resource is higher than the priority of the second uplink resource.

7. The method according to claim 1, wherein the first uplink resource and the second uplink resource are associated with different HARQ processes.

8. A communications apparatus, comprising:
at least one processor;
a non-transitory computer readable medium storing a program to be executed by the at least one processor, the program comprises instructions to:
send a signal to a network device on a first uplink resource, wherein the first uplink resource has a higher priority than a second uplink resource, and the first uplink resource overlaps with the second uplink resource in time domain; and
send a data packet to the network device on a third uplink resource, the data packet generated for the second uplink resource.

9. The apparatus according to claim 8, wherein the third uplink resource is an uplink resource that arrives after the second uplink resource.

10. The apparatus according to claim 8, wherein the third uplink resource and the second uplink resource are associated with a same hybrid automatic repeat request (HARQ) process.

11. The apparatus according to claim 8, wherein the third uplink resource and the second uplink resource are configuration grant resources that arrive in different periods.

12. The apparatus according to claim 8, the program further comprises instructions to:
determine that the priority of the first uplink resource is higher than the priority of the second uplink resource.

13. The apparatus according to claim 12, wherein the determining that the priority of the first uplink resource is higher than the priority of the second uplink resource comprises:
determining, based on a highest priority of a logical channel (LCH) to which data that can be transmitted on the first uplink resource and the second uplink resource belongs, that the priority of the first uplink resource is higher than the priority of the second uplink resource.

14. The apparatus according to claim 8, wherein the first uplink resource and the second uplink resource are associated with different HARQ processes.

15. A communications apparatus, comprising:
at least one processor;
a non-transitory computer readable medium storing a program to be executed by the at least one processor, the program comprises instructions to:
receive a signal from a terminal on a first uplink resource, wherein the first uplink resource has a higher priority than a second uplink resource, and the first uplink resource overlaps with the second uplink resource in a time domain; and
receive a data packet from the terminal on a third uplink resource, wherein the data packet is related to the second uplink resource.

16. The apparatus according to claim 15, wherein the third uplink resource is an uplink resource that arrives after the second uplink resource.

17. The apparatus according to claim 15, wherein the third uplink resource and the second uplink resource are associated with a same hybrid automatic repeat request (HARQ) process.

18. The apparatus according to claim 15, wherein the third uplink resource and the second uplink resource are configuration grant resources that arrive in different periods.

19. The apparatus according to claim 15, wherein a logical channel (LCH) with a highest priority in LCHs, to which data that can be transmitted on the first uplink resource belongs, has a higher priority than a LCH with a highest priority in LCHs, to which data that can be transmitted on the second uplink resource belongs.

20. The apparatus according to claim 15, wherein the first uplink resource and the second uplink resource are associated with different HARQ processes.

* * * * *